(12) United States Patent
Adams

(10) Patent No.: US 12,351,227 B1
(45) Date of Patent: Jul. 8, 2025

(54) CARGO HAULING ASSEMBLY AND METHOD OF UTILIZING THE CARGO HAULING ASSEMBLY ON A VEHICLE

(71) Applicant: John Eastman Adams, Spearfish, SD (US)

(72) Inventor: John Eastman Adams, Spearfish, SD (US)

( * ) Notice: Subject to any disclaimer, the term of this patent is extended or adjusted under 35 U.S.C. 154(b) by 164 days.

(21) Appl. No.: 18/196,162

(22) Filed: May 11, 2023

Related U.S. Application Data

(60) Provisional application No. 63/473,249, filed on May 16, 2022.

(51) Int. Cl.
*B60R 9/06* (2006.01)
*B62B 1/16* (2006.01)
*B62B 5/00* (2006.01)
*B62B 5/06* (2006.01)

(52) U.S. Cl.
CPC ............ *B62B 5/0003* (2013.01); *B60R 9/065* (2013.01); *B62B 1/16* (2013.01); *B62B 5/063* (2013.01); *B62B 2202/12* (2013.01)

(58) Field of Classification Search
CPC ......... B60R 9/06; B60R 9/065; B62B 5/0003; B62B 5/067; B62B 1/12; B62B 2205/12
USPC ......................................... 224/519, 526, 282
See application file for complete search history.

(56) References Cited

U.S. PATENT DOCUMENTS

| 6,345,749 | B1 * | 2/2002 | Hamilton | B60R 9/06 224/524 |
| 6,685,421 | B1 * | 2/2004 | Reeves | B60P 1/4407 414/540 |
| D772,764 | S * | 11/2016 | Thurber | D12/162 |
| 10,065,566 | B1 * | 9/2018 | Harbaugh | B60D 1/46 |
| 11,643,125 | B2 * | 5/2023 | Gamache | B62B 5/0003 280/401 |
| 11,834,090 | B1 * | 12/2023 | Shapiro | B62B 5/067 |
| 2010/0066069 | A1 * | 3/2010 | Bradshaw | B60R 9/06 280/769 |

* cited by examiner

*Primary Examiner* — Corey N Skurdal
(74) *Attorney, Agent, or Firm* — CANTOR COLBURN LLP

(57) ABSTRACT

A cargo hauling assembly having a mount-and-rotation tube assembly and a cargo carrier assembly is provided. The mount-and-rotation tube assembly has a main tubular portion, an end tubular portion, a circular end cap, and a spring pin assembly having first and second pins. The cargo carrier assembly has a rectangular-shaped frame, a receiver tube, and first and second wheels. The receiver tube is coupled to the rectangular-shaped frame. The receiver tube is sized and shaped to receive the end tubular portion in an interior region thereof. The cargo carrier assembly is coupled to the mount-and-rotation tube assembly such that first and second walls of the receiver tube are parallel to the first and second walls, respectively, of the main tubular portion and first and second pins are compressed by the first and second walls, respectively, of the receiver tube.

15 Claims, 21 Drawing Sheets

USER PROVIDES A MOUNT-AND-ROTATION TUBE ASSEMBLY HAVING A MAIN TUBULAR PORTION, AN END TUBULAR PORTION, A CIRCULAR END CAP, AND A SPRING PIN ASSEMBLY HAVING FIRST AND SECOND PINS; THE MAIN TUBULAR PORTION HAVING A FIRST END PORTION AND A SECOND END PORTION, A FIRST END OF THE END TUBULAR PORTION BEING COUPLED TO THE SECOND END PORTION OF THE MAIN TUBULAR PORTION, A SECOND END OF THE END TUBULAR PORTION BEING COUPLED TO THE CIRCULAR END CAP, THE MAIN TUBULAR PORTION HAVING A RECTANGULAR CROSS-SECTIONAL SHAPE WITH FIRST AND SECOND WALLS DISPOSED PARALLEL TO ONE ANOTHER, THE FIRST AND SECOND WALLS OF THE MAIN TUBULAR PORTION HAVING FIRST AND SECOND CLEVIS PIN HOLES, RESPECTIVELY, EXTENDING THERETHROUGH AT THE FIRST END PORTION; THE FIRST AND SECOND WALLS OF THE MAIN TUBULAR PORTION HAVING THIRD AND FOURTH CLEVIS PIN HOLES, RESPECTIVELY, EXTENDING THERETHROUGH AT THE SECOND END PORTION; THE END TUBULAR PORTION HAVING A CIRCULAR CROSS-SECTIONAL SHAPE WITH FIRST AND SECOND PIN APERTURES EXTENDING THERETHROUGH; THE SPRING PIN ASSEMBLY BEING DISPOSED IN THE END TUBULAR PORTION SUCH THAT THE FIRST AND SECOND PINS EXTEND THROUGH THE FIRST AND SECOND PIN APERTURES, RESPECTIVELY AND OUTWARDLY FROM THE END TUBULAR PORTION — 500

USER PROVIDES THE CARGO CARRIER ASSEMBLY HAVING A RECTANGULAR-SHAPED FRAME, A RECEIVER TUBE, FIRST AND SECOND WHEELS, AND A GRAB BAR; THE FIRST AND SECOND WHEELS BEING ROTATABLY COUPLED TO THE RECTANGULAR-SHAPED FRAME; THE RECEIVER TUBE BEING COUPLED TO AND EXTENDING TRANSVERSELY ACROSS THE RECTANGULAR-SHAPED FRAME AND EXTENDING OUTWARDLY FROM THE RECTANGULAR-SHAPED FRAME, THE RECEIVER TUBE HAVING A RECTANGULAR CROSS-SECTIONAL SHAPE WITH FIRST AND SECOND WALLS AND DEFINING AN INTERIOR REGION, THE FIRST AND SECOND WALLS OF THE RECEIVER TUBE HAVING FIRST AND SECOND RECEIVER HOLES, RESPECTIVELY, EXTENDING THERETHROUGH; THE RECEIVER TUBE BEING SIZED AND SHAPED TO RECEIVE THE END TUBULAR PORTION IN THE INTERIOR REGION THEREOF; THE GRAB BAR BEING COUPLED TO AND EXTENDING TRANSVERSELY ACROSS THE RECTANGULAR-SHAPED FRAME — 502

USER PROVIDES A VEHICLE HAVING A TRAILER HITCH RECEIVER THEREON — 504

CARGO HAULING ASSEMBLY AND METHOD OF UTILIZING THE CARGO HAULING ASSEMBLY ON A VEHICLE

CROSS-REFERENCE TO RELATED APPLICATIONS

This application claims priority to U.S. Provisional Patent Application No. 63/473,249 filed on May 16, 2022, the entire contents of which are hereby incorporated by reference herein.

BACKGROUND

Cargo carriers have been utilized on vehicles to carry cargo. A problem with the cargo carriers is that the carriers are relatively heavy and must be lifted off the ground by one or more people to couple the carriers to vehicle trailer hitches.

The inventors herein have recognized a need for an improved cargo hauling assembly and method that minimizes or eliminates the above-mentioned problem.

SUMMARY

A cargo hauling assembly in accordance with an exemplary embodiment is provided. The cargo hauling assembly includes a mount-and-rotation tube assembly having a main tubular portion, an end tubular portion, a circular end cap, and a spring pin assembly having first and second pins. The main tubular portion has a first end portion and a second end portion. A first end of the end tubular portion is coupled to the second end portion of the main tubular portion. A second end of the end tubular portion is coupled to the circular end cap. The main tubular portion has a rectangular cross-sectional shape with first and second walls disposed parallel to one another. The first and second walls of the main tubular portion have first and second clevis pin holes, respectively, extending therethrough at the first end portion. The first and second walls of the main tubular portion have third and fourth clevis pin holes, respectively, extending therethrough at the second end portion. The end tubular portion has a circular cross-sectional shape with first and second pin apertures extending therethrough. The spring pin assembly is disposed in the end tubular portion such that the first and second pins extend through the first and second pin apertures, respectively and outwardly from the end tubular portion. The cargo hauling assembly further includes a cargo carrier assembly having a rectangular-shaped frame, a receiver tube, and first and second wheels. The first and second wheels are rotatably coupled to the rectangular-shaped frame. The receiver tube is coupled to and extends transversely across the rectangular-shaped frame and extends outwardly from the rectangular-shaped frame. The receiver tube has a rectangular cross-sectional shape with first and second walls disposed parallel to one another and defining an interior region. The first and second walls of the receiver tube have first and second receiver holes, respectively, extending therethrough. The receiver tube is sized and shaped to receive the end tubular portion in the interior region thereof. The cargo carrier assembly is coupled to the mount-and-rotation tube assembly such that the first and second walls of the receiver tube are parallel to the first and second walls, respectively, of the main tubular portion of the mount-and-rotation tube assembly and the first and second pins are compressed by the first and second walls, respectively, of the receiver tube. The cargo hauling assembly further includes a clevis pin that is disposed through the first and second receiver holes and the third and fourth clevis pin holes to couple the receiver tube to the mount-and-rotation tube assembly.

A method for utilizing a cargo carrier assembly on a vehicle with another exemplary embodiment is provided. The method includes providing a mount-and-rotation tube assembly having a main tubular portion, an end tubular portion, a circular end cap, and a spring pin assembly having first and second pins. The main tubular portion has a first end portion and a second end portion. A first end of the end tubular portion is coupled to the second end portion of the main tubular portion. A second end of the end tubular portion is coupled to the circular end cap. The main tubular portion has a rectangular cross-sectional shape with first and second walls disposed parallel to one another. The first and second walls of the main tubular portion have first and second clevis pin holes, respectively, extending therethrough at the first end portion. The first and second walls of the main tubular portion have third and fourth clevis pin holes, respectively, extending therethrough at the second end portion. The end tubular portion has a circular cross-sectional shape with first and second pin apertures extending therethrough. The spring pin assembly is disposed in the end tubular portion such that the first and second pins extend through the first and second pin apertures, respectively and outwardly from the end tubular portion. The method further includes providing the cargo carrier assembly having a rectangular-shaped frame, a receiver tube, and first and second wheels. The first and second wheels are rotatably coupled to the rectangular-shaped frame. The receiver tube is coupled to and extends transversely across the rectangular-shaped frame and extends outwardly from the rectangular-shaped frame. The receiver tube has a rectangular cross-sectional shape with first and second walls disposed parallel to one another and defines an interior region. The first and second walls of the receiver tube have first and second receiver holes, respectively, extending therethrough. The receiver tube is sized and shaped to receive the end tubular portion in the interior region thereof. The method further includes raising a second end portion of the rectangular-shaped frame of the cargo carrier assembly while the first and second wheels are contacting a ground surface, and the receiver tube is disposed on the end tubular portion such that the end tubular portion is received in the interior region of the receiver tube and the first and second pins are moved longitudinally past the first and second receiver holes. The method further includes rotating the receiver tube on the end tubular portion such that the first and second walls of the receiver tube are parallel to the first and second walls, respectively, of the main tubular portion of the mount-and-rotation tube assembly and the first and second pins are compressed by the first and second walls, respectively, of the receiver tube. The method further includes moving the receiver tube further longitudinally toward the main tubular portion of the mount-and-rotation tube assembly such that the first and second receiver holes, respectively, of the receiver tube are aligned with the third and fourth clevis pin holes of the main tubular portion. The method further includes inserting a second clevis pin through the first and second receiver holes and the third and fourth clevis pin holes to couple the receiver tube to the mount-and-rotation tube assembly.

BRIEF DESCRIPTION OF THE DRAWINGS

FIG. 31 illustrates a first portion of a flowchart of a method for utilizing an embodiment of a cargo carrier assembly on a vehicle;

DETAILED DESCRIPTION

Figure 1:
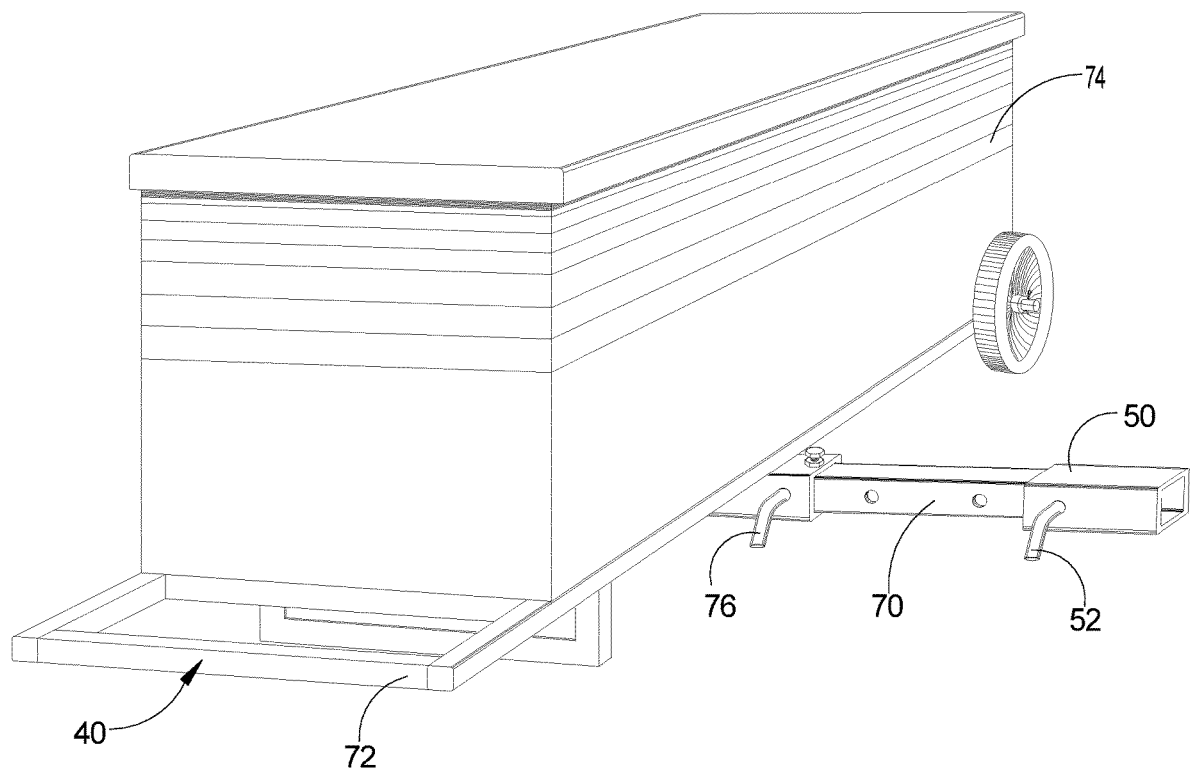
FIG. 1 is a schematic of a cargo hauling assembly having a cargo carrier assembly, a cargo box, and a mount-androtation tube assembly in accordance with an exemplary embodiment wherein the cargo carrier assembly is coupled to a trailer hitch receiver.
Figure 2:
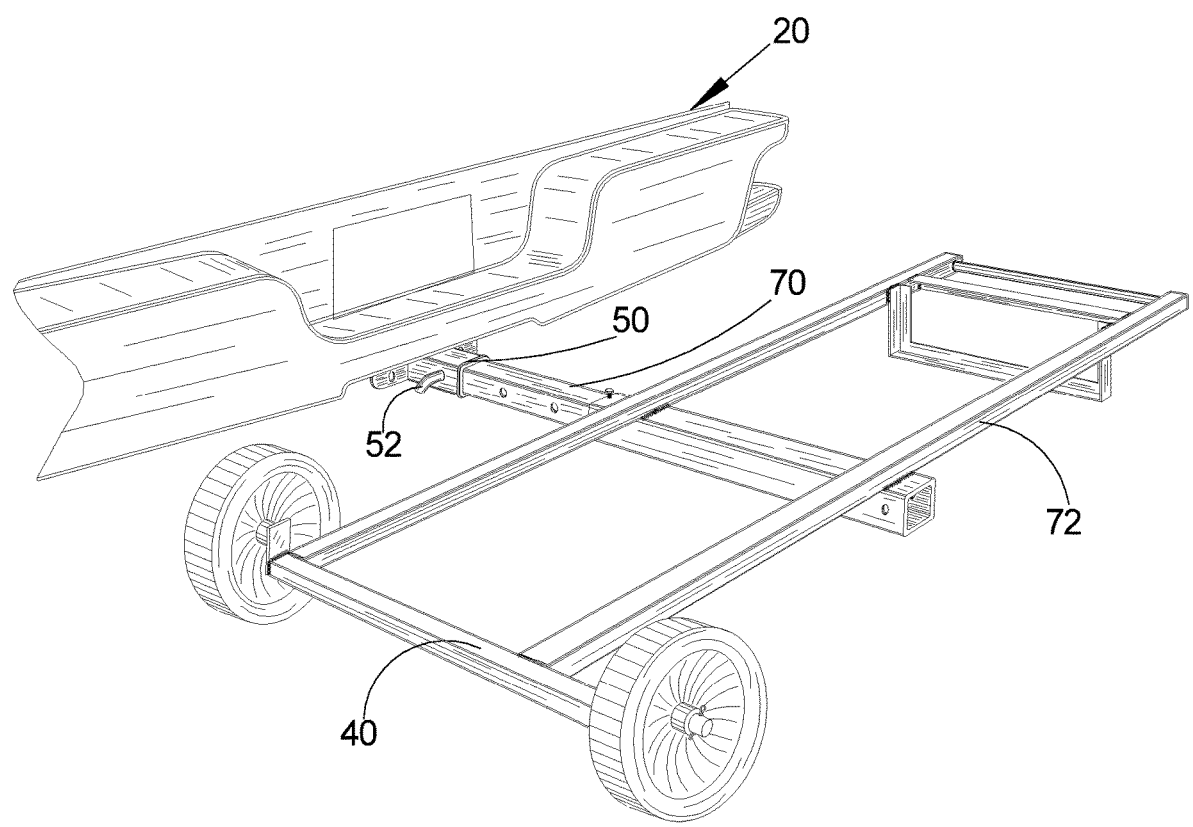
FIG. 2 is a schematic of the cargo carrier assembly of FIG. 1 with the cargo box removed from the cargo carrier assembly.
Figure 3:
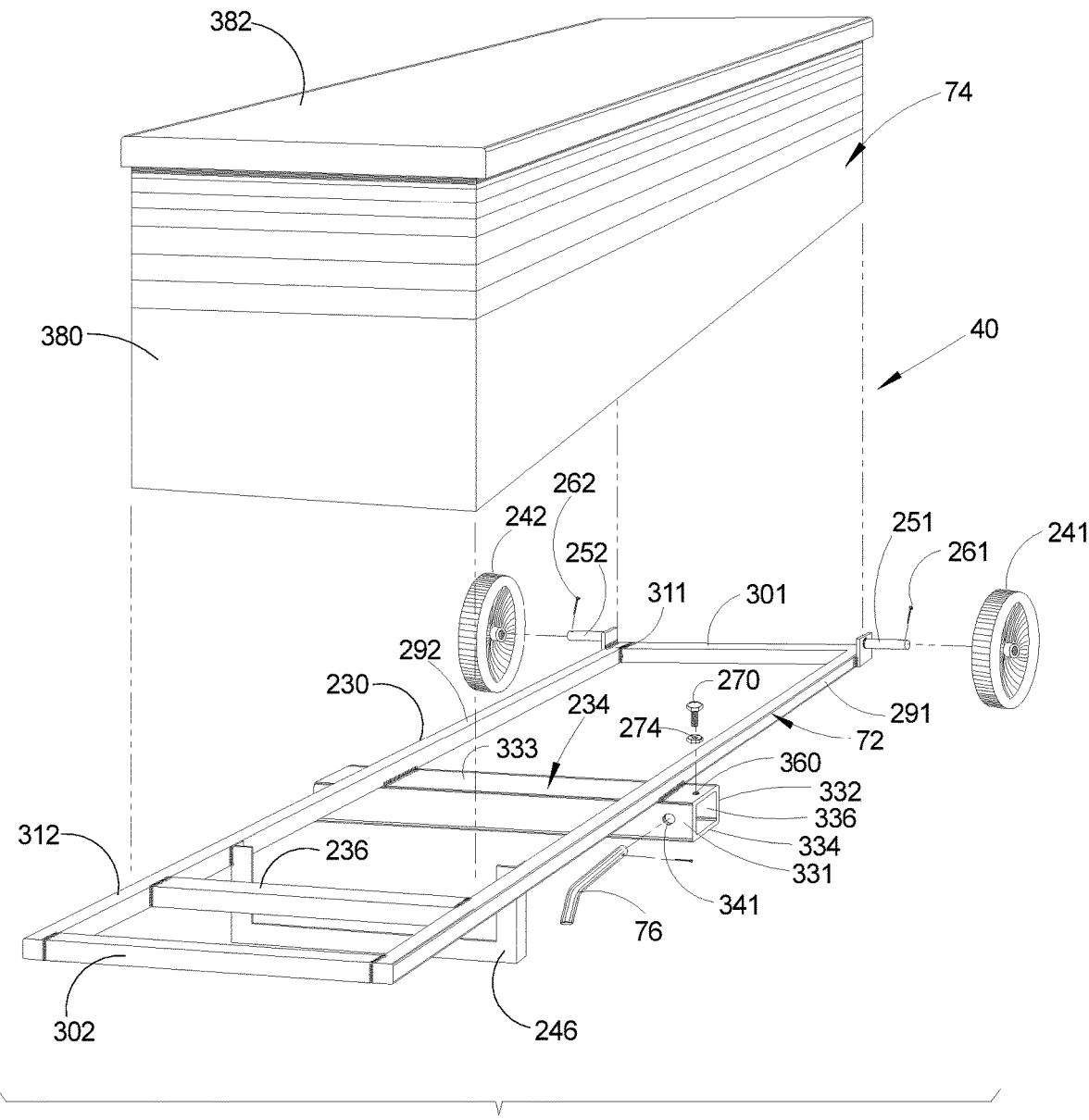
FIG. 3 is an exploded view of the cargo carrier assembly and the cargo box of FIG. 1.

Referring to FIGS. 1-3, a vehicle 20 and a cargo hauling assembly 40 in accordance with an exemplary embodiment are illustrated.

Figure 5:
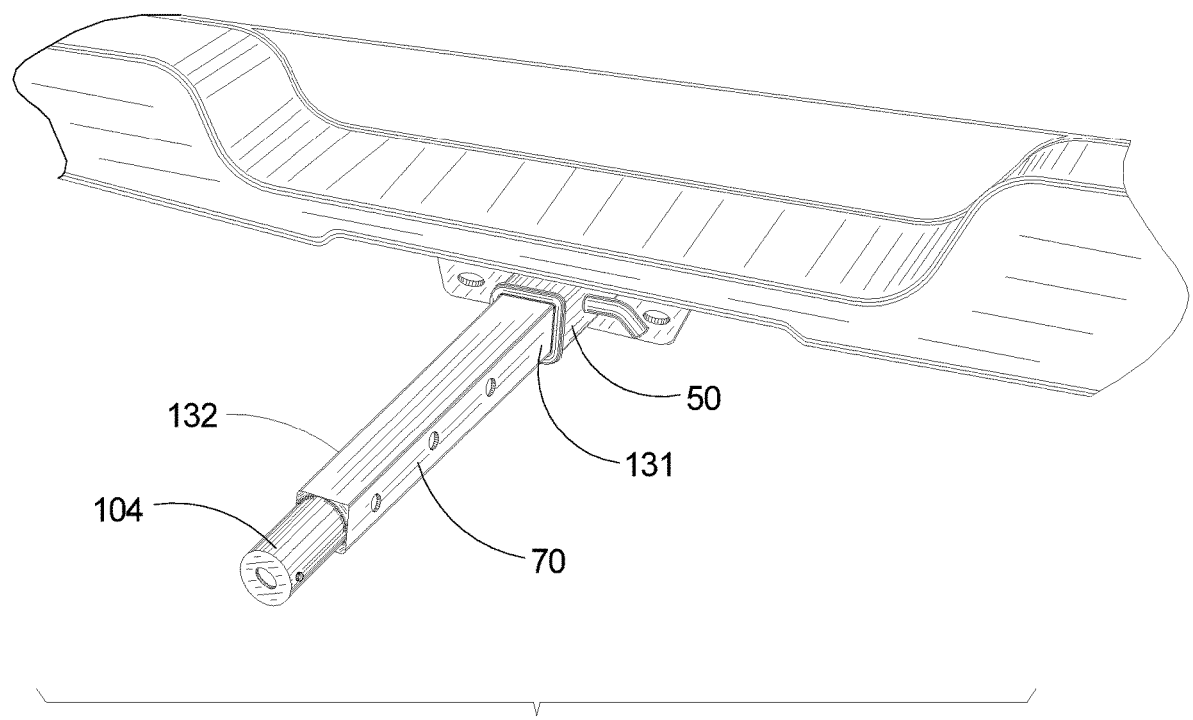
FIG. 5 is a schematic of the mount-and-rotation tube assembly of FIG. 1 coupled to the trailer hitch receiver.

Referring to FIGS. 2 and 5, the vehicle 20 includes a trailer hitch receiver 50 and a clevis pin 52 coupled to the trailer hitch receiver 50. The trailer hitch receiver 50 is provided to removably couple the cargo hauling assembly 40 thereto utilizing the clevis pin 52.

Referring to FIGS. 1-5, the cargo hauling assembly 40 is provided to hold cargo thereon. Further, the cargo hauling assembly 40 is provided to be removably coupled to the trailer hitch receiver 50. The cargo hauling assembly 40 includes a mount-and-rotation tube assembly 70, a cargo carrier assembly 72, a cargo box 74, and a clevis pin 76.

An advantage of the cargo hauling assembly 40 is that the assembly 40 utilizes the mount-and-rotation tube assembly 70 having an end tubular portion 104 with a circular cross-sectional shape that allows a receiver tube 234 having a rectangular cross-sectional shape on the cargo carrier assembly 72 to be rotated on the end tubular portion 104 for initially coupling the cargo carrier assembly 72 to the mount-and-rotation tube assembly 70. The end tubular portion 104 having a circular cross-sectional shape that is inserted into the interior region 336 (having a rectangular cross-sectional space) of the receiver tube 234 has the added benefit of additional clearance in the corners of the interior region 336 between the end tubular portion 104 and the receiver tube 234, which facilitates non-binding assembly and disassembly. The end tubular portion 104 has a relatively large length to diameter aspect ratio which when inserted into the rectangular interior region 336 helps the user to control the cargo carrier assembly 72 during rotation. In particular, a user can easily lift/rotate the cargo carrier assembly 72 on the mount-and-rotation tube assembly 70 even if the cargo carrier assembly 72 is holding a relatively heavy cargo thereon. Further, the mount-and-rotation tube assembly 70 utilizes a spring pin assembly 112 (shown in FIG. 8) having first and second pins 211, 212 that are used to orient the receiver tube 234 on the mount-and-rotation tube assembly 70 when coupling the receiver tube 234 on the mount-and-rotation tube assembly 70. Further, the first and second pins 211, 212 are utilized to position the receiver tube 234 at a desired longitudinal position for subsequently rotating the receiver tube 234 to de-couple the receiver tube 234 from the mount-and-rotation tube assembly 70.

Referring to FIGS. 2 and 5-10, the mount-and-rotation tube assembly 70 is provided to be coupled to the trailer hitch receiver 50 of the vehicle 20 and to the cargo carrier assembly 72. The mount-and-rotation tube assembly 70 has a main tubular portion 100, an end tubular portion 104, a circular end cap 108, and a spring pin assembly 112. The assembly 70 extends along a longitudinal axis 114.

Figure 6:
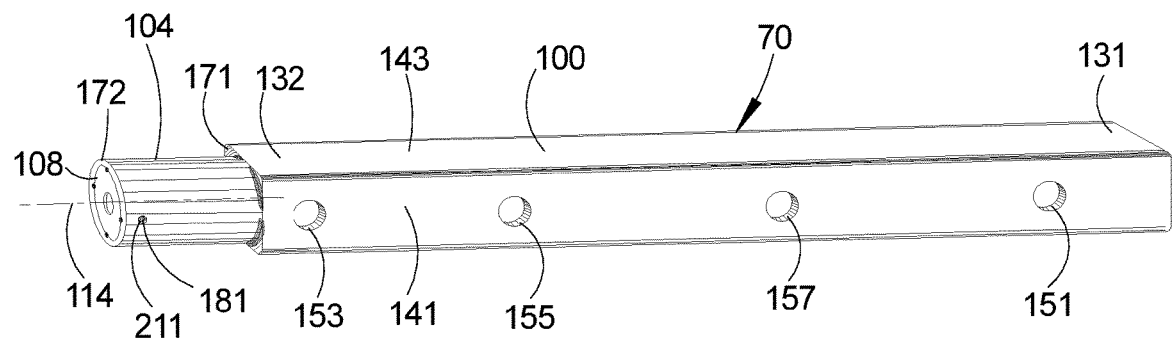
FIG. 6 is an isometric view of the mount-and-rotation tube assembly of FIG. 5.
Figure 7:
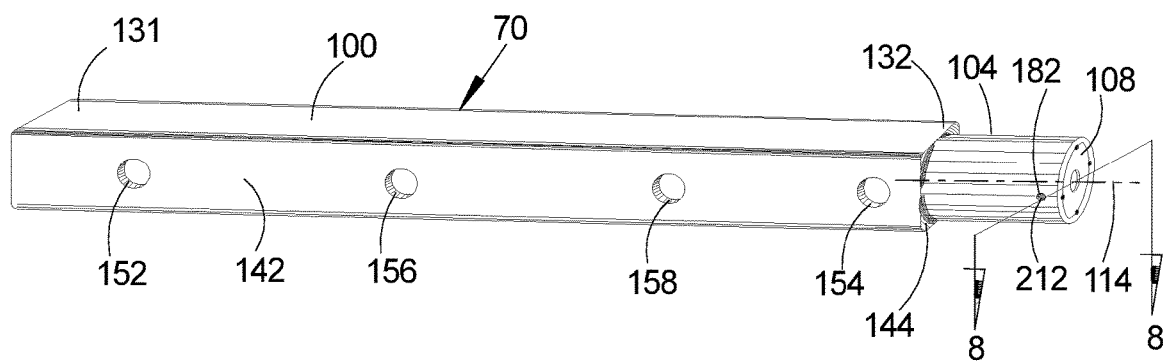
FIG. 7 is another isometric view of the mount-and-rotation tube assembly of FIG. 5.

Referring to FIGS. 2, 6 and 7, the main tubular portion 100 has a first end portion 131, a second end portion 132, first, second, third, and fourth walls 141, 142, 143, 144, and first, second, third, fourth, fifth, sixth, seventh, and eighth clevis pin holes 151, 152, 153, 154, 155, 156, 157, 158. The main tubular portion 100 has a rectangular cross-sectional shape. In an exemplary embodiment, the main tubular portion 100 is constructed of a metal such as steel for example.

The first and second walls 141, 142 are spaced apart and extend parallel to one another. The third and fourth walls 143, 144 are spaced apart and extend parallel to one another. Further, the third and fourth walls 143, 144 are coupled to and between the first and second walls 141, 142 and are disposed perpendicular to the first and second walls 141, 142.

The first wall 141 has the first clevis pin hole 151, the third clevis pin hole 153, the fifth clevis pin hole 155, and the seventh clevis pin hole 157 extending therethrough which are longitudinally aligned with one another. The first clevis pin hole 151 is disposed at the first end portion 131 of the main tubular portion 100. The third clevis pin hole 153 is disposed at the second end portion 132 of the main tubular portion 100.

The second wall 142 has the second clevis pin hole 152, the fourth clevis pin hole 154, the sixth clevis pin hole 156, and the eighth clevis pin hole 158 extending therethrough which are longitudinally aligned with one another. The second clevis pin hole 152 is disposed at the first and portion 131 of the main tubular portion 100. The fourth clevis pin hole 154 is disposed at the second end portion 132 of the main tubular portion 100.

The first and second clevis pin holes 151, 152 are aligned with one another. Also, the third and fourth clevis pin holes 153, 154 are aligned with one another. Further, the fifth and sixth clevis pin holes 155, 156 are aligned with one another. Also, the seventh and eighth clevis pin holes 157, 158 are aligned with one another.

Figure 8:
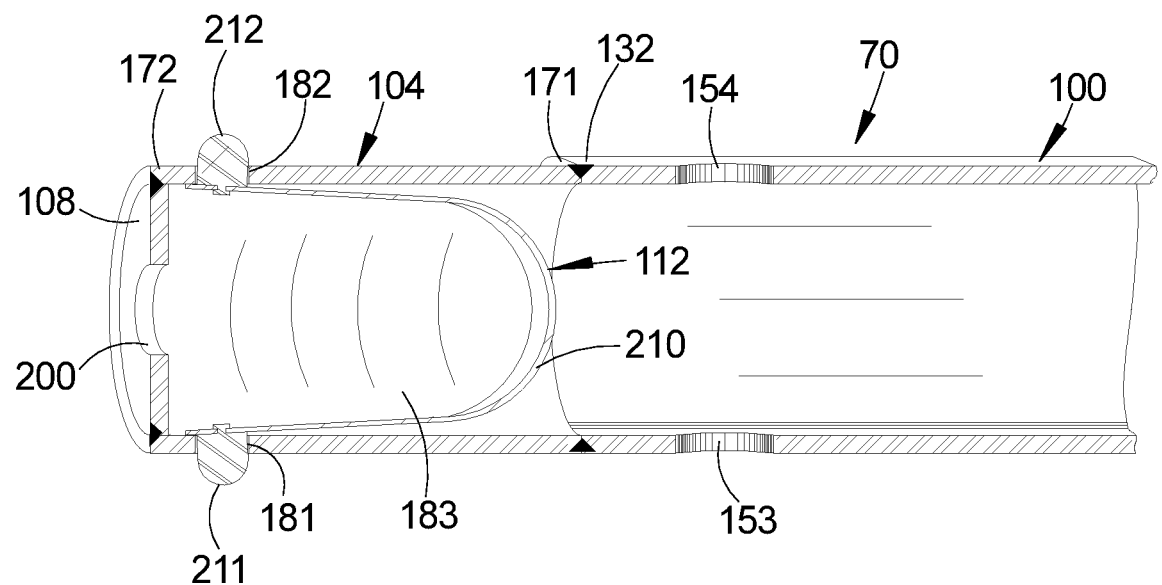
FIG. 8 is a cross-sectional view of the mount-and-rotation tube assembly of FIG. 7 taken along lines 8-8 in FIG. 7.

Referring to FIGS. 6-8, the end tubular portion 104 is provided to allow the cargo carrier assembly 72 to be rotated on the end tubular portion 104. The end tubular portion 104 includes a first end 171, a second end 172, and first and second pin apertures 181, 182 extending therethrough. The first end 131 of the end tubular portion 104 is coupled to the second end portion 132 of the main tubular portion 100. The second end 172 of the end tubular portion 104 is coupled to the circular end cap 108. The end tubular portion 104 has a circular cross-sectional shape. Referring to FIG. 6, the first pin aperture 181 is longitudinally aligned with the first clevis pin hole 151, the third clevis pin hole 153, the fifth clevis pin hole 155, and the seventh clevis pin hole 157. Referring to FIG. 7, the second pin aperture 182 is longitudinally aligned with the second clevis pin hole 152, the fourth clevis pin hole 154, the sixth clevis pin hole 156, and the eighth clevis pin hole 158. In an exemplary embodiment, the end tubular portion 104 is constructed of a metal such as steel for example.

Referring to FIG. 8, the circular end cap 108 includes a hole 200 extending therethrough. The hole 200 is provided to allow a user to access an interior region 183 of the end tubular portion 104.

Figure 9:
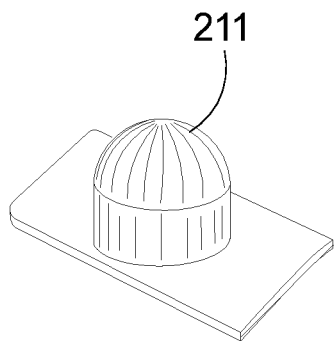
FIG. 9 is a schematic of a portion of a spring pin assembly utilized in the mount-and-rotation tube assembly of FIG. 8
Figure 10:
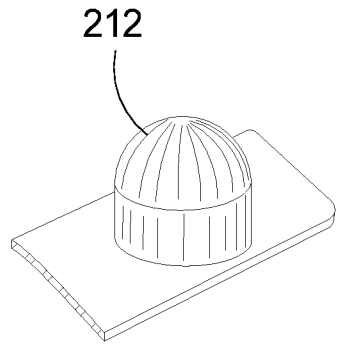
FIG. 10 is a schematic of another portion of the spring pin assembly utilized in the mount-and-rotation tube assembly of FIG. 8

Referring to FIGS. 8-10, the spring pin assembly 112 includes a U-shaped spring portion 210, a first pin 211, and a second pin 212. The first pin 211 is coupled to a first end of the spring portion 210, and the second pin 212 is coupled to a second end of the U-shaped spring portion 210. The spring pin assembly 112 is disposed in the interior region 183 of the end tubular portion 104 such that the first and second pins 211, 212 extend through the first and second pin apertures 181, 182, respectively and outwardly from the end tubular portion 104. In an exemplary embodiment, the spring pin assembly 112 is constructed of a metal such as steel.

Figure 4:
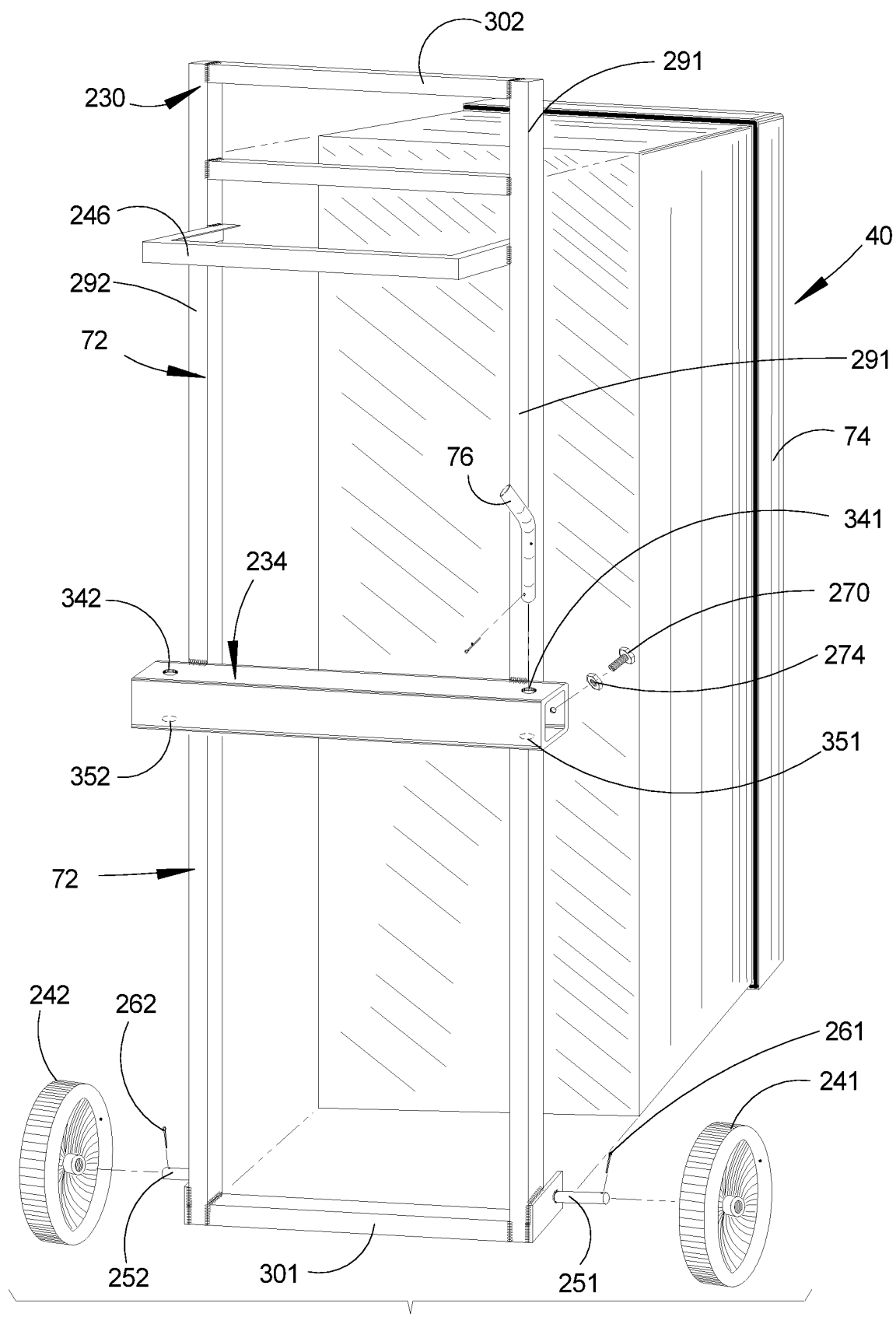
FIG. 4 is another exploded view of the cargo carrier assembly and the cargo box of FIG. 1.

Referring to FIGS. 1, 3 and 4, the cargo carrier assembly 72 is provided to hold the cargo box 74 thereon. Also, the cargo carrier assembly 72 is provided to hold cargo directly thereon. The cargo carrier assembly 72 includes a rectangular-shaped frame 230, receiver tube 234, a central tubular portion 236, first and second wheels 241, 242, a grab bar 246, a first axle portion 251, a second axle portion 252, a first coupling pin 261, a second coupling pin 262, a set screw 270, and a nut 274.

Referring to FIGS. 3 and 4, the rectangular-shaped frame 230 is provided to hold the remaining components of the cargo carrier assembly 72 thereon. The rectangular-shaped frame 230 includes a first side tubular portion 291, a second side tubular portion 292, a first end tubular portion 301, a second end tubular portion 302, a first end portion 311, and a second portion 312. The first and second side tubular portions 291, 292 extend parallel to one another. The first and second end tubular portions 301, 302 extend parallel to one another and are coupled to and between the first and second side tubular portions 291, 292. In an exemplary embodiment, the rectangular-shaped frame 230 is constructed of a metal such as steel.

Referring to FIGS. 1 and 3-5, the receiver tube 234 is provided to be removably coupled to the mount-and-rotation tube assembly 70. In particular, the receiver tube 234 (having a rectangular cross-sectional shape) is sized and shaped to receive the end tubular portion 104 (having a circular cross-sectional shape) in the interior region 336 (shown in FIG. 3) thereof. The receiver tube 234 is coupled to and extends transversely across the rectangular-shaped frame 230 and extends outwardly from the rectangular-shaped frame 230. The receiver tube 234 has a rectangular cross-sectional shape. Referring to FIG. 3, the receiver tube 234 includes first, second, third, and fourth walls 331, 332, 333, 334 that define an interior region 336.

Referring to FIGS. 3 and 4, the first and second walls 331, 332 are spaced apart and extend parallel to one another. The third and fourth walls 333, 334 are spaced apart and extend parallel to one another. Further, the third and fourth walls 333, 334 are coupled to and between the first and second walls 331, 332 and are disposed perpendicular to the first and second walls 331, 332. The first wall 331 includes receiver holes 341, 342 extending therethrough. The second wall 332 includes receiver holes 351, 352 extending therethrough. The receiver holes 341, 351 are aligned with one another. Further, the receiver holes 342, 352 are aligned with one another. The third wall 333 has a set-screw hole 360 extending therethrough. The set screw hole 360 receives the set-screw 270 therethrough. In particular, the set screw 360 extends through a nut 274 and the set screw hole 360 and contacts the mount-and-rotation tube assembly 70 when the receiver tube 234 is coupled to the assembly 70.

The central tubular portion 236 is coupled to and extends between the first and second side tubular portions 291, 292 of the rectangular-shaped frame 230. In an exemplary embodiment, the central tubular portion 236 is constructed of a metal such as steel.

The grab bar 246 is provided to allow a user to easily lift the second end portion 312 of the rectangular-shaped frame 230. The grab bar 246 is coupled to and between the first and second side tubular portions 291, 292 of the rectangular-shaped frame 230. In an exemplary embodiment, the grab bar 246 is constructed of a metal such as steel.

The first and second axle portions 251, 252 are coupled to the first and second side tubular portions 291, 292, respectively, and extend outwardly from the first and second side tubular portions 291, 292, respectively. In an exemplary embodiment, the first and second axle portions 251, 252 are constructed of a metal such as steel.

The first wheel 241 is rotatably coupled to the rectangular-shaped frame 230 utilizing the first axle portion 251. The first coupling pin 261 extends through the first axle portion 251 and is utilized to maintain the first wheel 241 on the first axle portion 251.

The second wheel 242 is rotatably coupled to the rectangular-shaped frame 230 utilizing the second axle portion 252. The second coupling pin 262 extends through the second axle portion 252 and is utilized to maintain the second wheel 242 on the second axle portion 252.

Referring to FIGS. 1 and 3, the cargo box 74 is coupled to the rectangular-shaped frame 230 of the cargo carrier assembly 72 utilizing bolts (not shown). The cargo box 74 includes a box portion 380 and a lid portion 382 coupled to the box portion 380.

Referring to FIGS. 3, 6 and 7, the clevis pin 76 extends through the receiver holes 341, 342 in the receiver tube 234 and the first and second clevis pin holes 151, 152 in the main tubular portion 100 of mount-and-rotation tube assembly 70 to couple the cargo carrier assembly 72 to the mount-and-rotation tube assembly 70.

Referring to FIGS. 1-10 and 31-34, a flowchart of a method for utilizing the cargo carrier assembly 40 on the vehicle 20 in accordance with another exemplary embodiment will now be explained.

At step 500, referring to FIGS. 5-10 and 31, a user provides a mount-and-rotation tube assembly 70 having a main tubular portion 100, an end tubular portion 104, a circular end cap 108, and a spring pin assembly 112 having first and second pins 211, 212. The main tubular portion 100 having a first end portion 131 and a second end portion 132. A first end 171 of the end tubular portion 104 is coupled to the second end portion 132 of the main tubular portion 100. A second end 172 of the end tubular portion 104 is coupled to the circular end cap 108. The main tubular portion 100 has a rectangular cross-sectional shape with first and second walls 141, 142 disposed parallel to one another. The first and second walls 141, 142 of the main tubular portion 100 has first and second clevis pin holes 151, 152, respectively, extending therethrough at the first end portion 131. The first and second walls 141, 142 of the main tubular portion 100 has third and fourth clevis pin holes 153, 154, respectively, extending therethrough at the second end portion 132. The end tubular portion 104 has a circular cross-sectional shape with first and second pin apertures 181, 182 extending therethrough. The spring pin assembly 112 is disposed in the end tubular portion 104 such that the first and second pins 211, 212 extend through the first and second pin apertures 181, 182, respectively and outwardly from the end tubular portion 104.

At step 502, referring to FIGS. 2-4 and 31, the user provides the cargo carrier assembly 72 having a rectangular-shaped frame 230, a receiver tube 234, first and second wheels 241, 242, and a grab bar 246. The first and second wheels 241, 242 are rotatably coupled to the rectangular-shaped frame 230. The receiver tube 234 is coupled to and extends transversely across the rectangular-shaped frame 230 and extends outwardly from the rectangular-shaped frame 230. The receiver tube 234 has a rectangular cross-sectional shape with first and second walls 331, 332 and defines an interior region 336. The first and second walls 331, 332 of the receiver tube 234 have first and second receiver holes 341, 351 (shown in FIG. 4), respectively, extending therethrough. The receiver tube 234 is sized and shaped to receive the end tubular portion 104 (shown in FIG. 6) in the interior region 336 thereof. The grab bar 246 is coupled to and extends transversely across the rectangular-shaped frame 230.

At step 504, referring to FIGS. 2 and 31, the user provides a vehicle 20 having a trailer hitch receiver 50 thereon.

Figure 13:
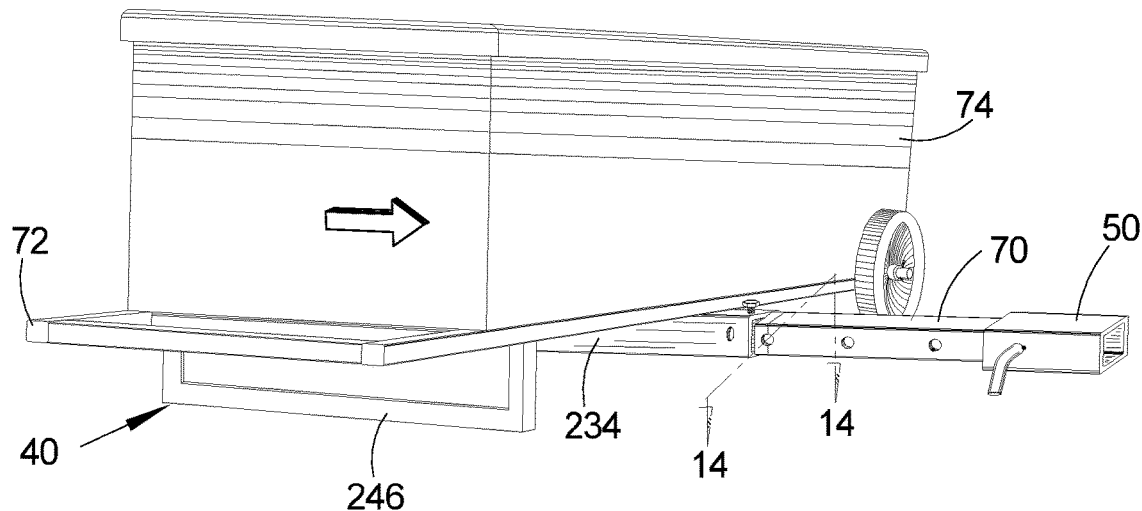
FIG. 13 is an isometric view of the cargo carrier assembly and the cargo box thereon that are rotatably coupled to the mount-and-rotation tube assembly.
Figure 32:
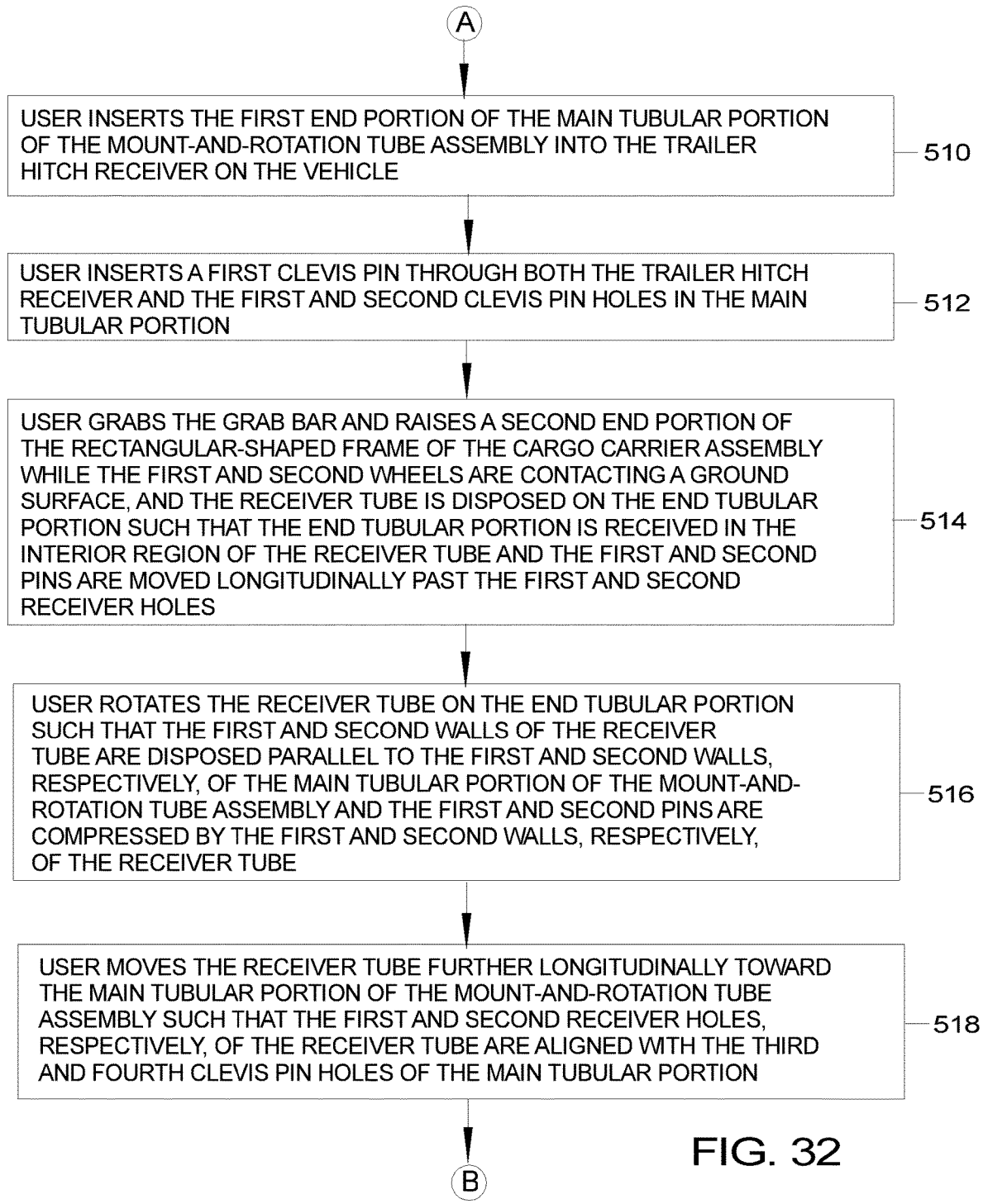
FIG. 32 illustrates a second portion of the flowchart of a method for utilizing an embodiment of a cargo carrier assembly on a vehicle.

At step 510, referring to FIGS. 5, 13 and 32, the user inserts the first end portion 131 of the main tubular portion 100 of the mount-and-rotation tube assembly 70 into the trailer hitch receiver 50 on the vehicle 20.

At step 512, referring to FIGS. 5, 6 and 32, the user inserts a first clevis pin 52 through both the trailer hitch receiver 50 and the first and second clevis pin holes 151, 152 in the main tubular portion 100.

Figure 11:
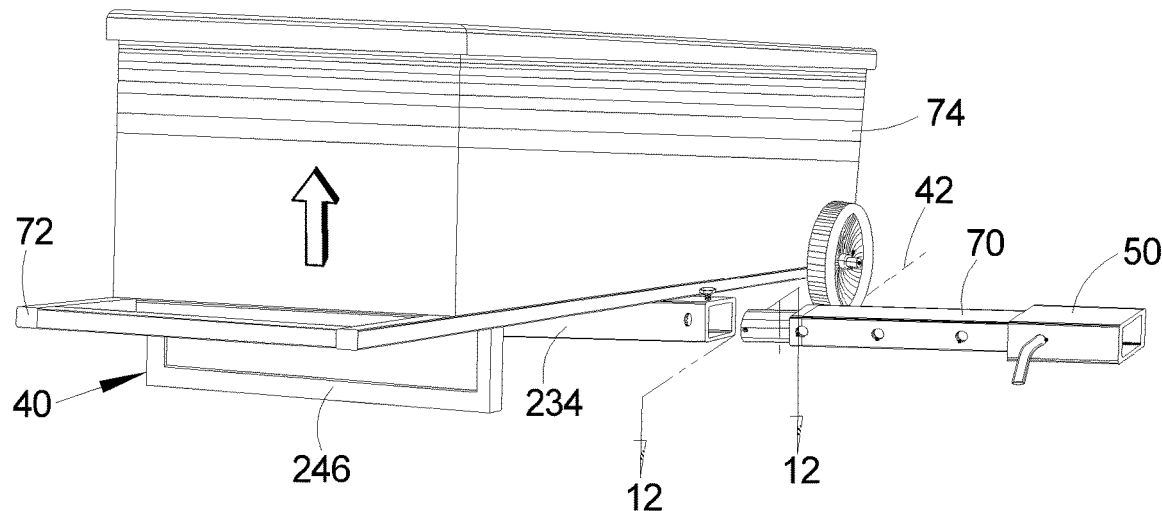
FIG. 11 is an isometric view of the cargo carrier assembly and the cargo box thereon prior to being coupled to the mount-and-rotation tube assembly.
Figure 12:
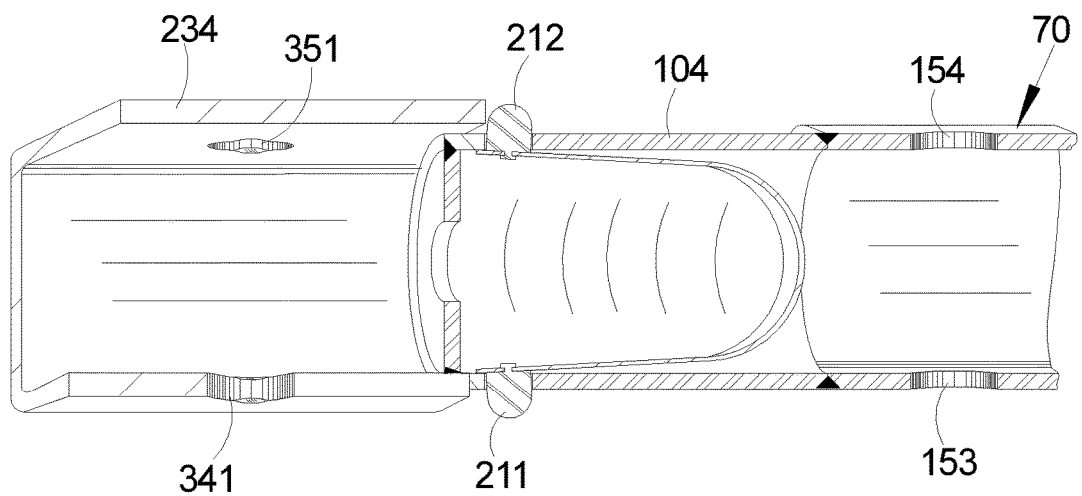
FIG. 12 is a cross-sectional view of a portion of the cargo carrier assembly and the mount-and-rotation tube assembly of FIG. 11 taken along lines 12-12 in FIG. 11.
Figure 14:
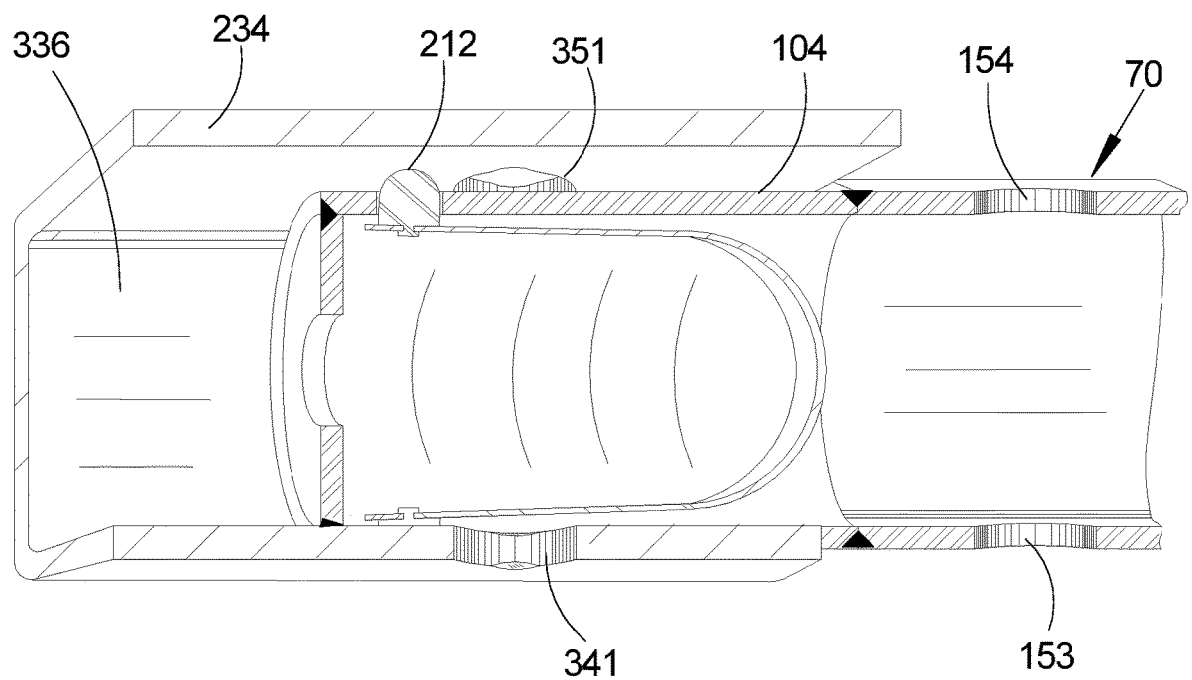
FIG. 14 is a cross-sectional view of a portion of the cargo carrier assembly and the mount-and-rotation tube assembly of FIG. 13 taken along lines 14-14 in FIG. 13.

At step 514, referring to FIGS. 11, 12, and 32, the user grabs the grab bar 246 and raises a second end portion 312 of the rectangular-shaped frame 230 of the cargo carrier assembly 72 while the first and second wheels 241, 242 are contacting a ground surface 42. Referring to FIGS. 13 and 14, the receiver tube 234 is disposed on the end tubular portion 104 such that the end tubular portion 104 is received in the interior region 336 of the receiver tube 234 and the first and second pins 211, 212 are moved longitudinally past the first and second receiver holes 341, 351.

Figure 15:
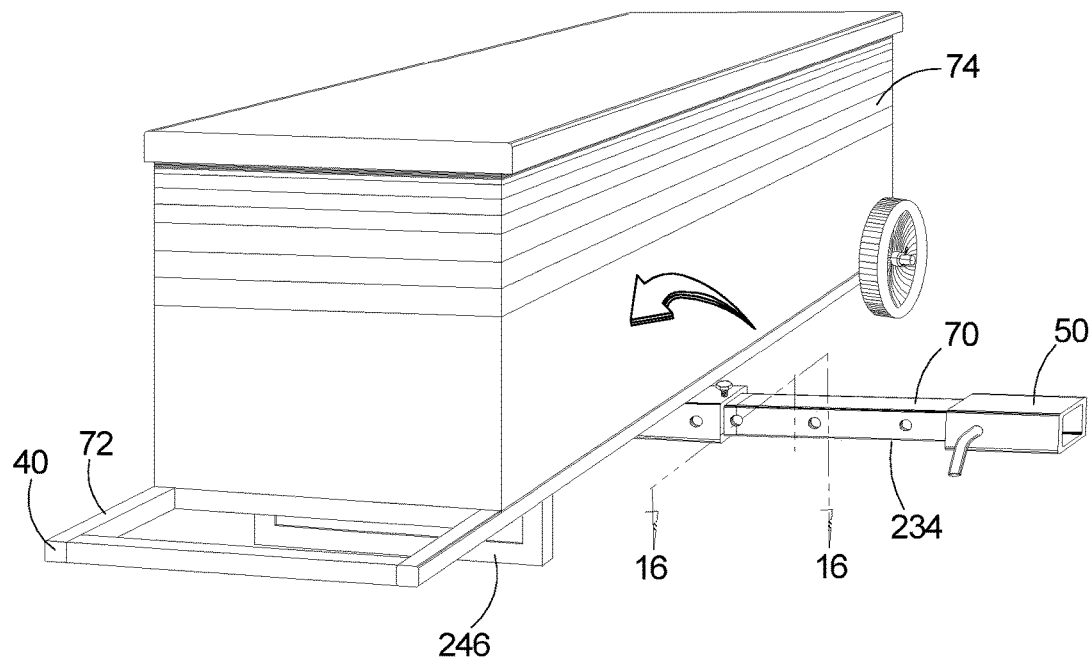
FIG. 15 is an isometric view of the cargo carrier assembly and the cargo box thereon that has been rotated in a first rotational direction on the mount-and-rotation tube assembly.
Figure 16:
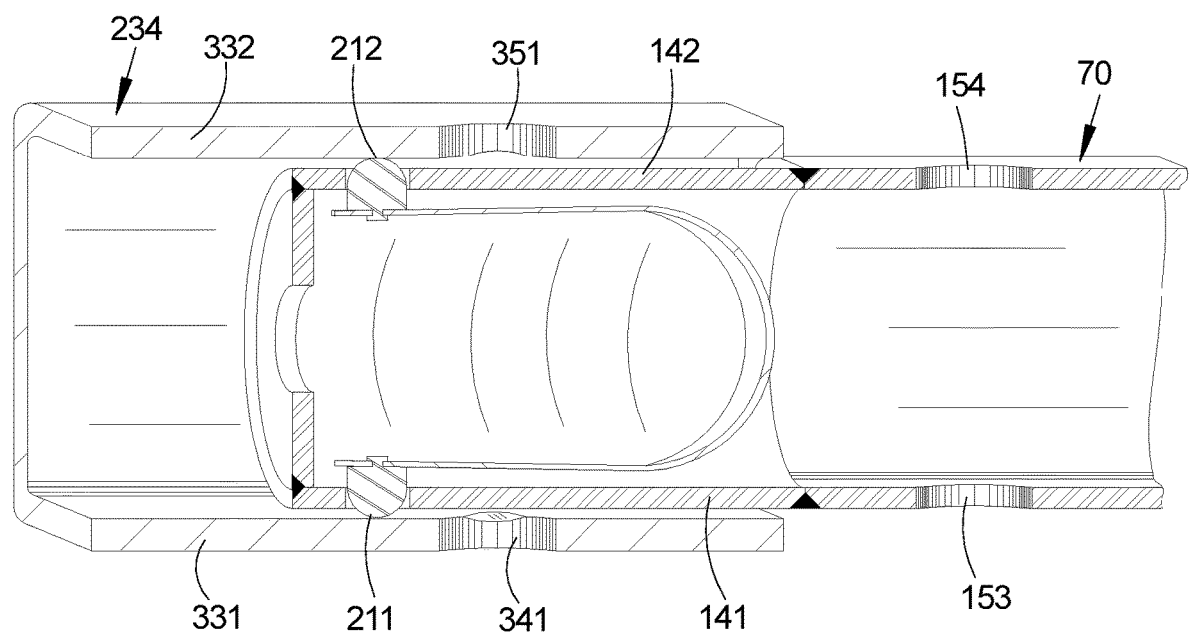
FIG. 16 is a cross-sectional view of a portion of the cargo carrier assembly and the mount-and-rotation tube assembly of FIG. 15 taken along lines 16-16 in FIG. 15.

At step 516, referring to FIGS. 15, 16, and 32, the user rotates the receiver tube 234 on the end tubular portion 104 such that the first and second walls 331, 332 of the receiver tube 234 are disposed parallel to the first and second walls 141, 142, respectively, of the main tubular portion 100 of the mount-and-rotation tube assembly 70 and the first and second pins 211, 212 are compressed by the first and second walls 331, 332, respectively, of the receiver tube 234.

Figure 17:
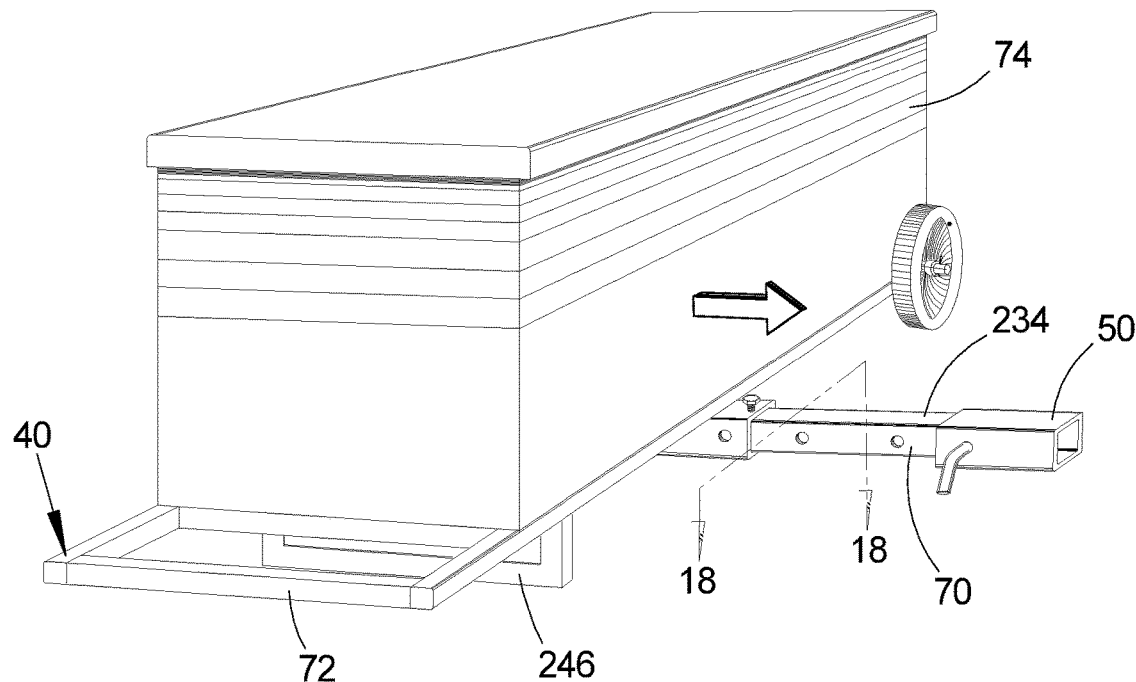
FIG. 17 is an isometric view of the cargo carrier assembly and the cargo box thereon that has been moved longitudinally in a first direction (rightwardly in FIG. 17) on the mount-and-rotation tube assembly to a desired coupling position.
Figure 18:
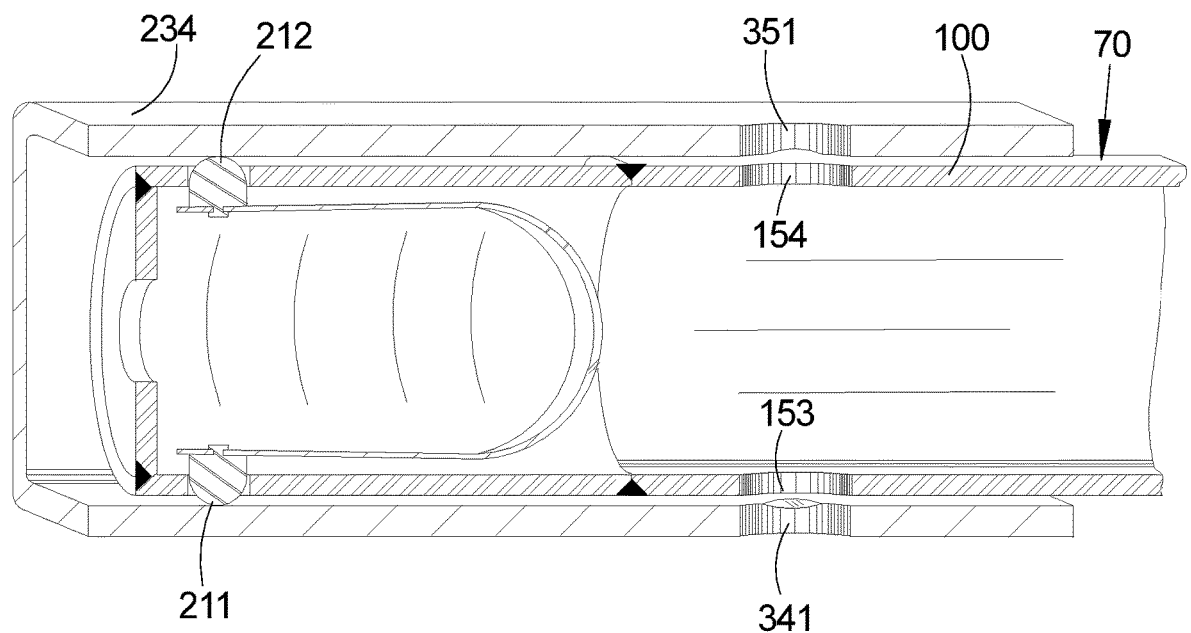
FIG. 18 is a cross-sectional view of a portion of the cargo carrier assembly and the mount-and-rotation tube assembly of FIG. 17 taken along lines 18-18 in FIG. 17.

At step 518, referring to FIGS. 17, 18, and 32, the user moves the receiver tube 234 further longitudinally toward the main tubular portion 100 of the mount-and-rotation tube assembly 70 such that the first and second receiver holes 341, 351, respectively, of the receiver tube 234 are aligned with the third and fourth clevis pin holes 153, 154 of the main tubular portion 100.

Figure 19:
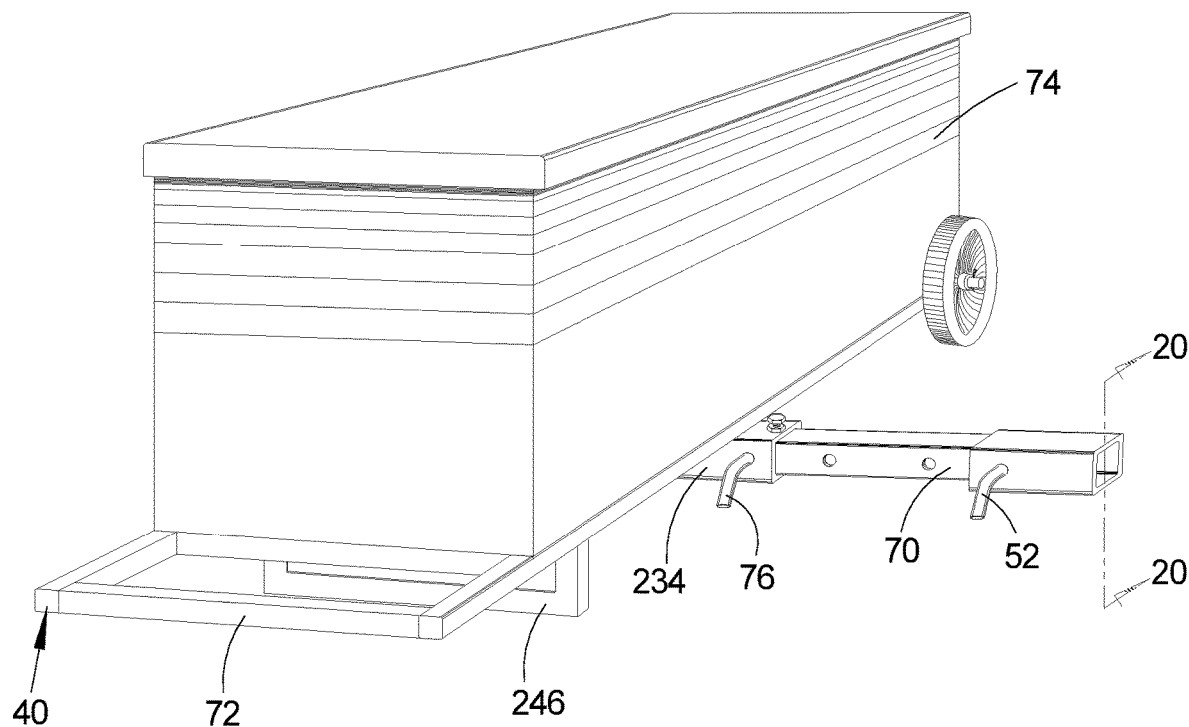
FIG. 19 is an isometric view of the cargo carrier assembly and the cargo box thereon that has been coupled to the mount-and-rotation tube assembly at the desired coupling position utilizing a clevis pin.
Figure 20:
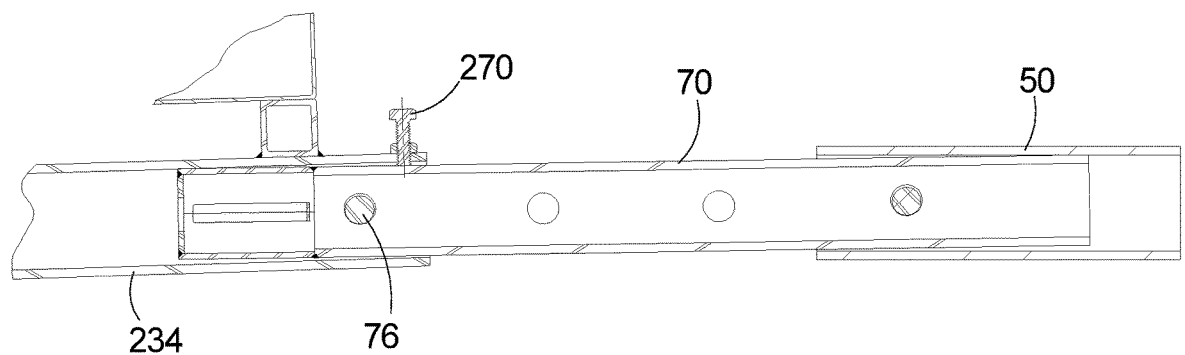
FIG. 20 is a cross-sectional view of a portion of the cargo carrier assembly and the mount-and-rotation tube assembly of FIG. 19 taken along lines 20-20 in FIG. 19.
Figure 33:
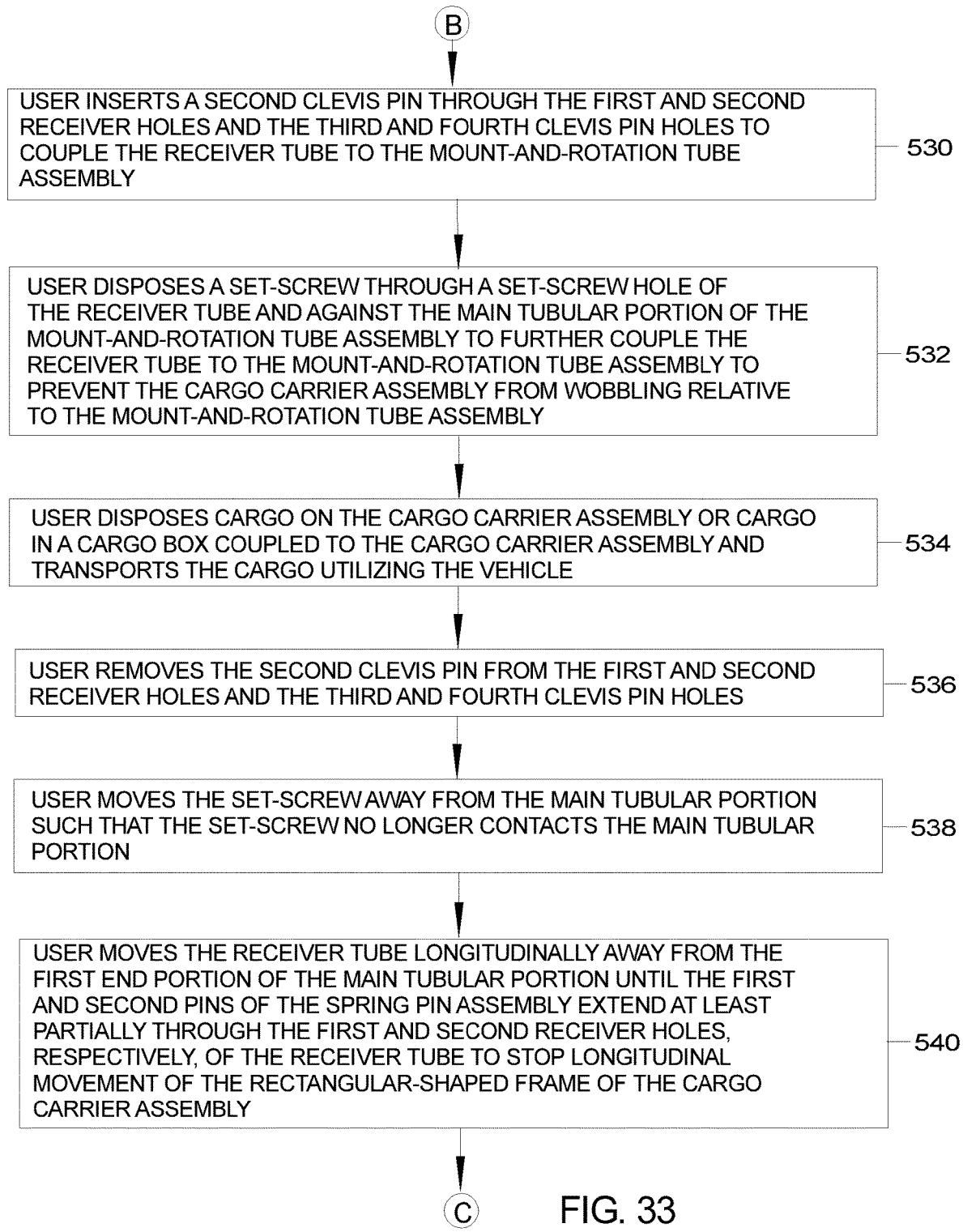
FIG. 33 illustrates a third portion of the flowchart of a method for utilizing an embodiment of a cargo carrier assembly on a vehicle.

At step 530, referring to FIGS. 19, 20, and 33, the user inserts a second clevis pin 76 through the first and second receiver holes 341, 351 (shown in FIG. 4) and the third and fourth clevis pin holes 153, 154 (shown in FIGS. 6 and 7) to couple the receiver tube 234 to the mount-and-rotation tube assembly 70.

At step 532, referring to FIGS. 3, 20 and 33, the user disposes a set-screw 270 through a set-screw hole 360 of the receiver tube 234 and against the main tubular portion 100 of the mount-and-rotation tube assembly 70 to further couple the receiver tube 234 to the mount-and-rotation tube assembly to prevent the cargo carrier assembly 72 from wobbling relative to the mount-and-rotation tube assembly 70.

Figure 21:
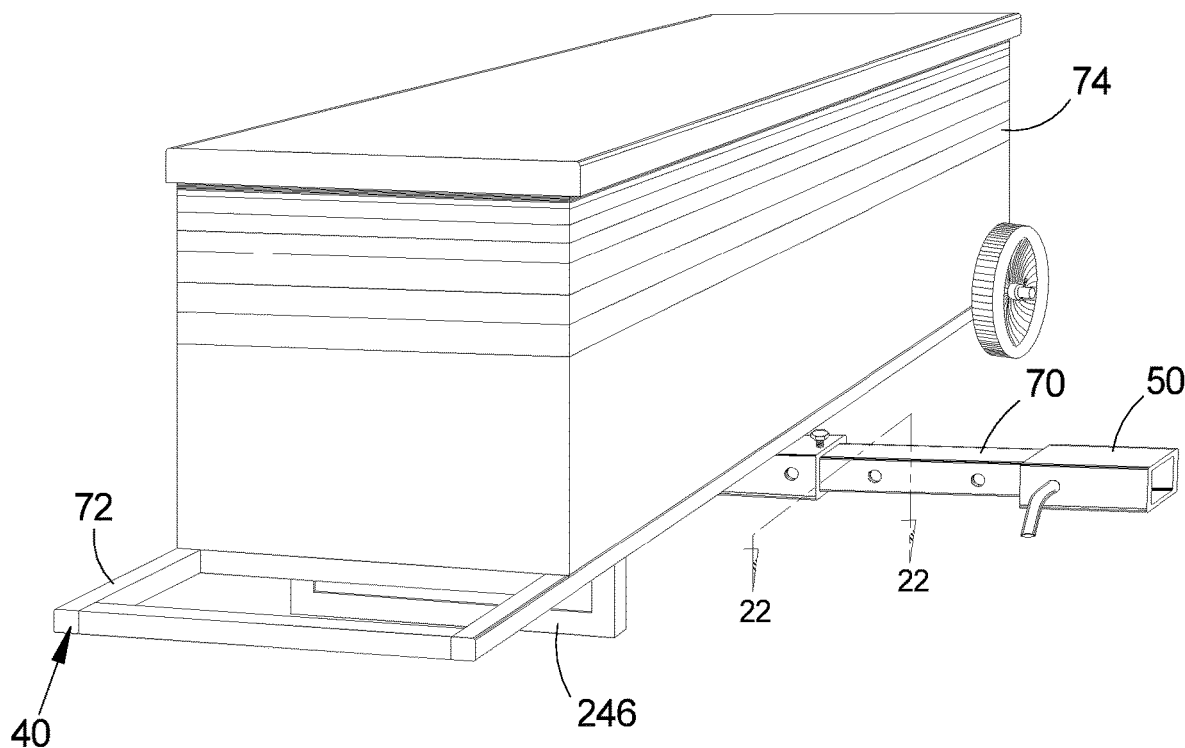
FIG. 21 is an isometric view of the cargo carrier assembly and the cargo box thereon that has been coupled to the mount-and-rotation tube assembly at the desired coupling position with a clevis pin removed for de-coupling the cargo carrier assembly from the mount-and-rotation tube assembly.
Figure 22:
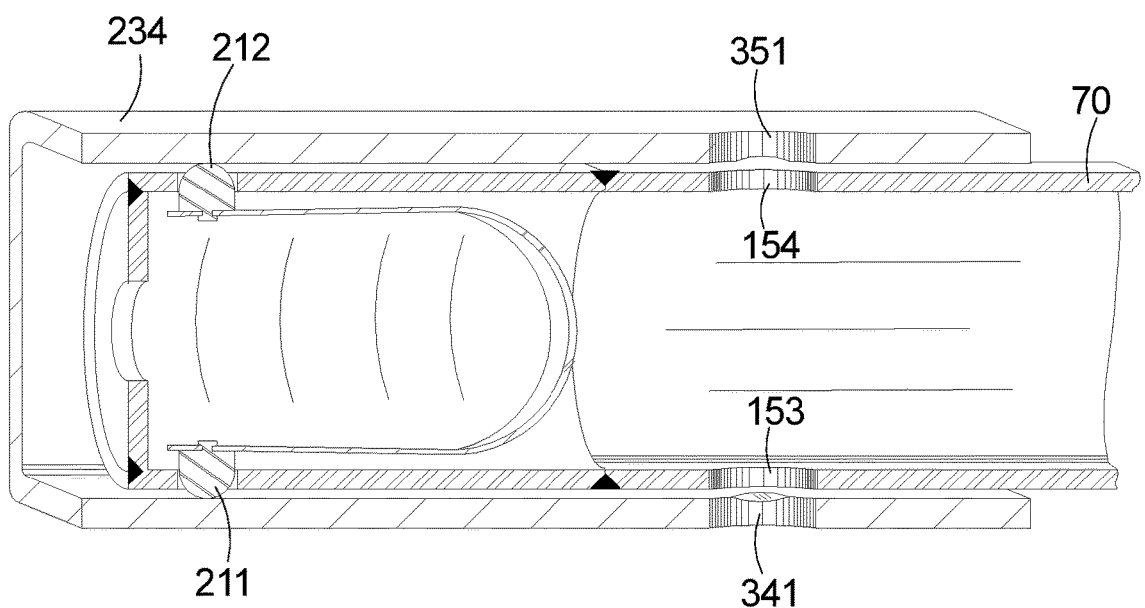
FIG. 22 is a cross-sectional view of a portion of the cargo carrier assembly and the mount-and-rotation tube assembly of FIG. 21 taken along lines 22-22 in FIG. 21.

At step 534, referring to FIGS. 21 and 22, the user disposes cargo on the cargo carrier assembly 72 or cargo in a cargo box 74 coupled to the cargo carrier assembly 72 and transports the cargo utilizing the vehicle 20.

Figure 23:
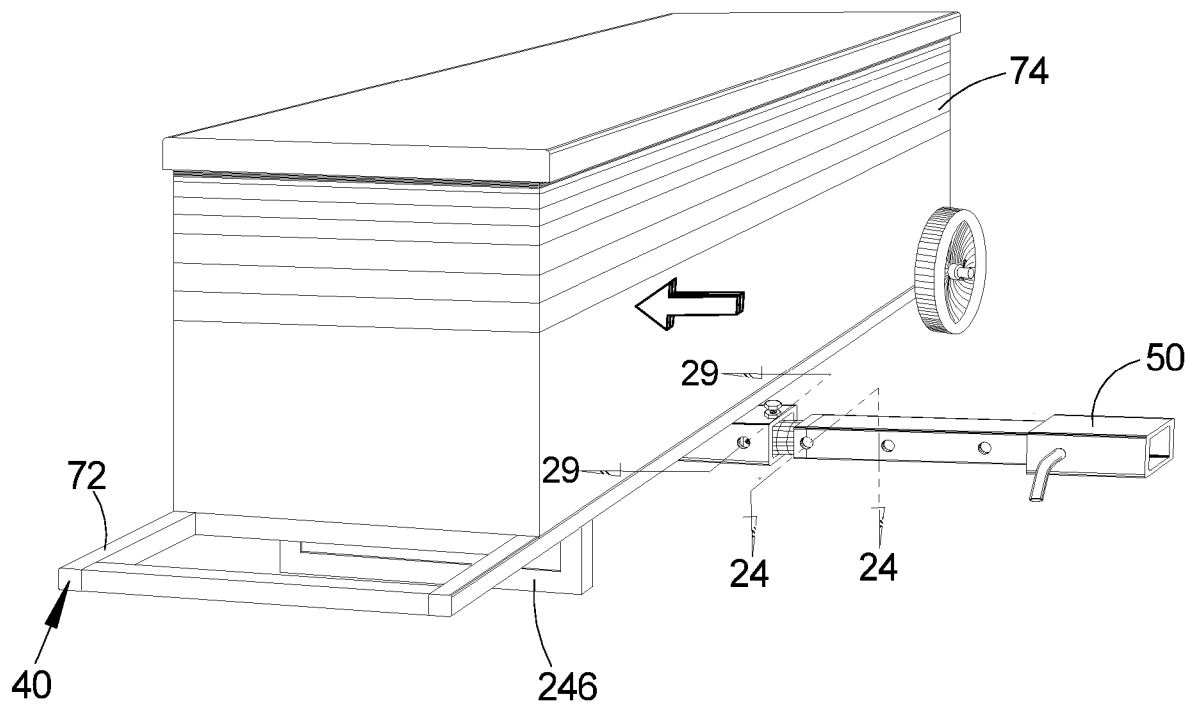
FIG. 23 is an isometric view of the cargo carrier assembly and the cargo box thereon that has been moved longitudinally in a second direction (leftwardly in FIG. 23) on the mount-and-rotation tube assembly.

At step 536, referring to FIGS. 23 and 33, the user removes the second clevis pin 76 from the first and second receiver holes 341, 351 and the third and fourth clevis pin holes 153, 154.

At step 538, the user moves the set-screw 270 away from the main tubular portion 100 such that the set-screw 270 no longer contacts the main tubular portion 100.

Figure 24:
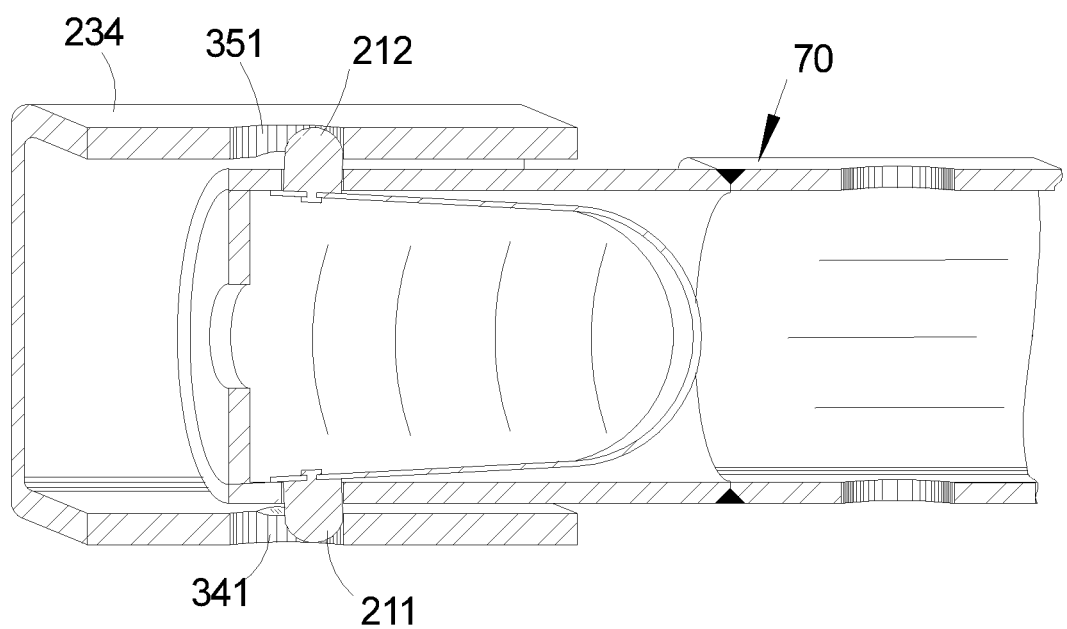
FIG. 24 is a cross-sectional view of a portion of the cargo carrier assembly and the mount-and-rotation tube assembly of FIG. 23 taken along lines 24-24 in FIG. 23.

At step 540, referring to FIGS. 23, 24, and 33, the user moves the receiver tube 234 longitudinally away from the first end portion 131 of the main tubular portion 100 until the first and second pins 211, 212 of the spring pin assembly 112 extend at least partially through the first and second receiver holes 341, 351, respectively, of the receiver tube 234 to stop longitudinal movement of the rectangular-shaped frame 230 of the cargo carrier assembly 72.

Figure 25:
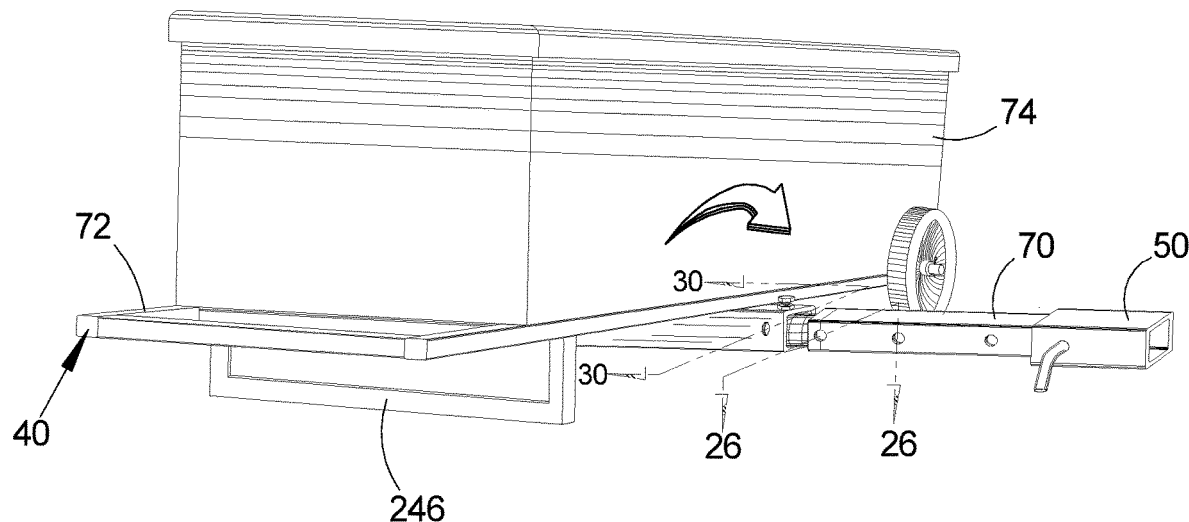
FIG. 25 is an isometric view of the cargo carrier assembly and the cargo box thereon that has been rotated in a second rotational direction on the mount-and-rotation tube assembly.
Figure 26:
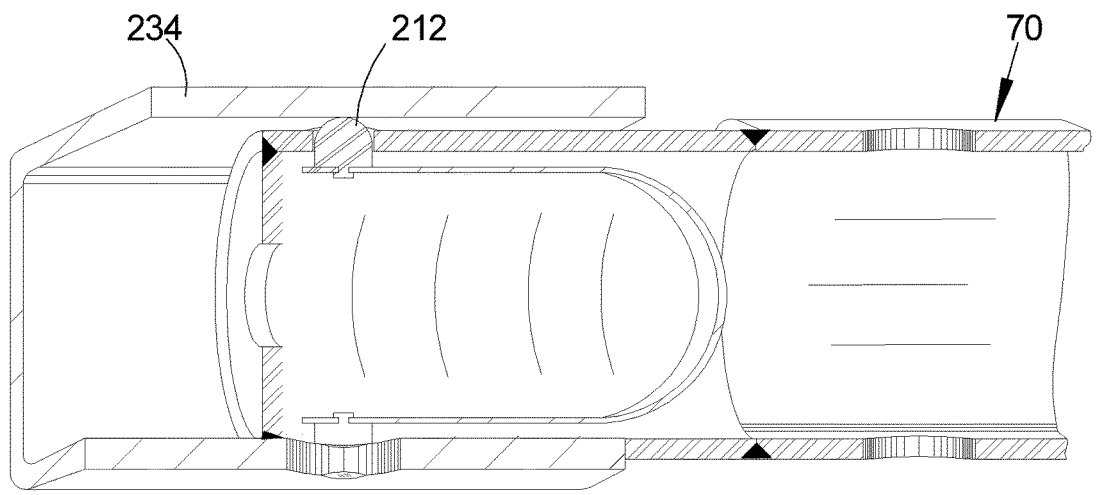
FIG. 26 is a cross-sectional view of a portion of the cargo carrier assembly and the mount-and-rotation tube assembly of FIG. 25 taken along lines 26-26 in FIG. 25.
Figure 34:
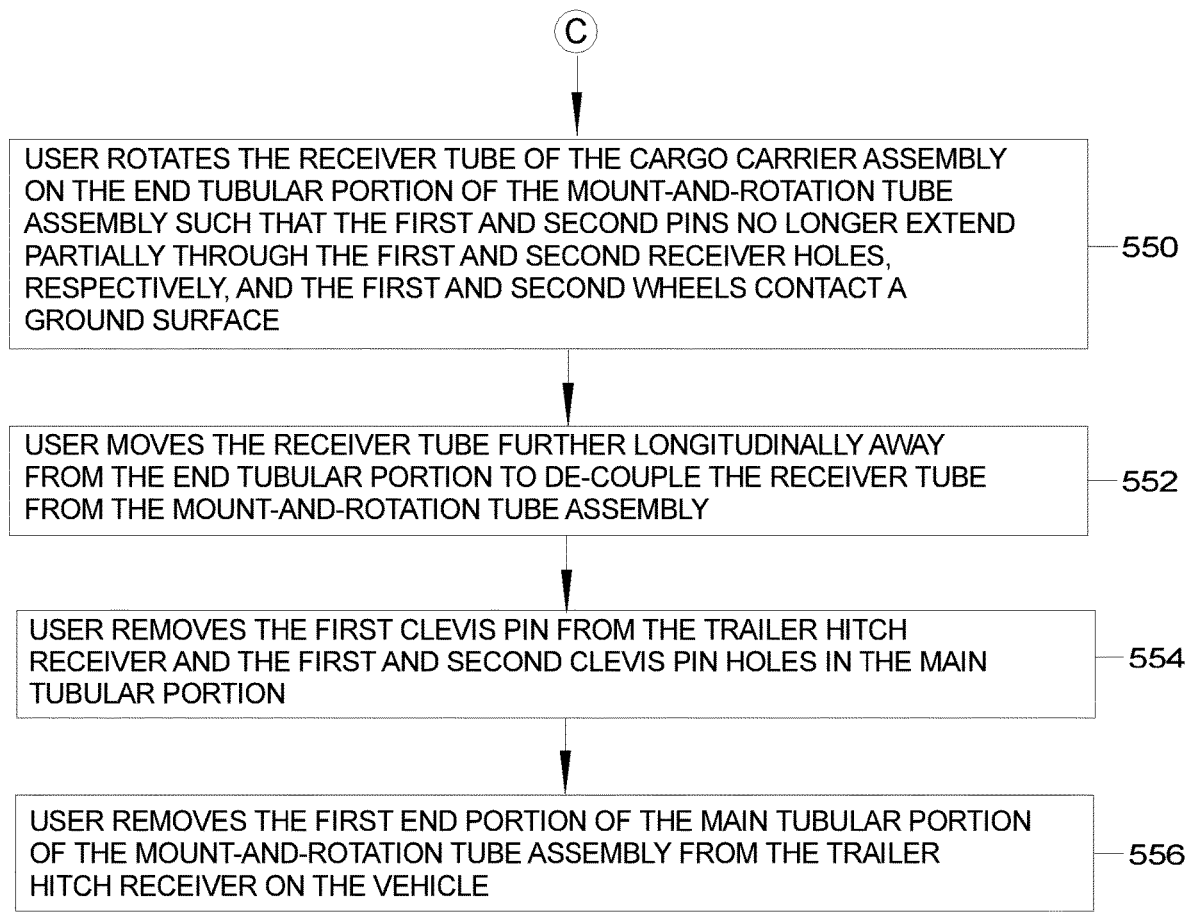
FIG. 34 illustrates a fourth portion of the flowchart of a method for utilizing an embodiment of a cargo carrier assembly on a vehicle.

At step 550, referring to FIGS. 25, 26 and 34, the user rotates the receiver tube 234 of the cargo carrier assembly 72 on the end tubular portion 104 of the mount-and-rotation tube assembly 70 such that the first and second pins 211, 212 no longer extend partially through the first and second receiver holes 341, 351, respectively, and the first and second wheels 241, 242 contact a ground surface.

Figure 27:
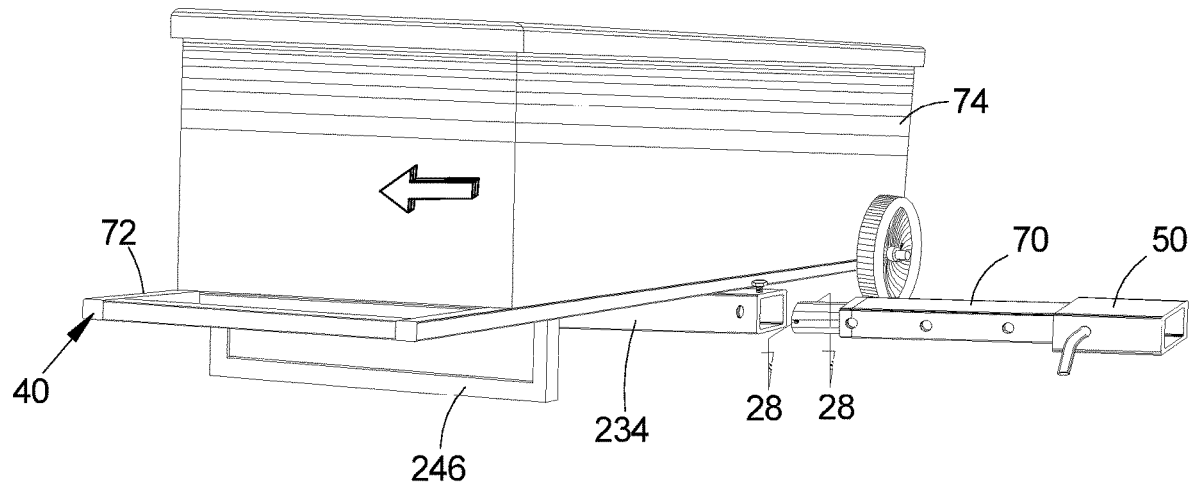
FIG. 27 is an isometric view of the cargo carrier assembly and the cargo box thereon that has been further moved longitudinally in a second direction (leftwardly in FIG. 23) to de-couple the cargo carrier assembly from the mount-and-rotation tube assembly.
Figure 28:
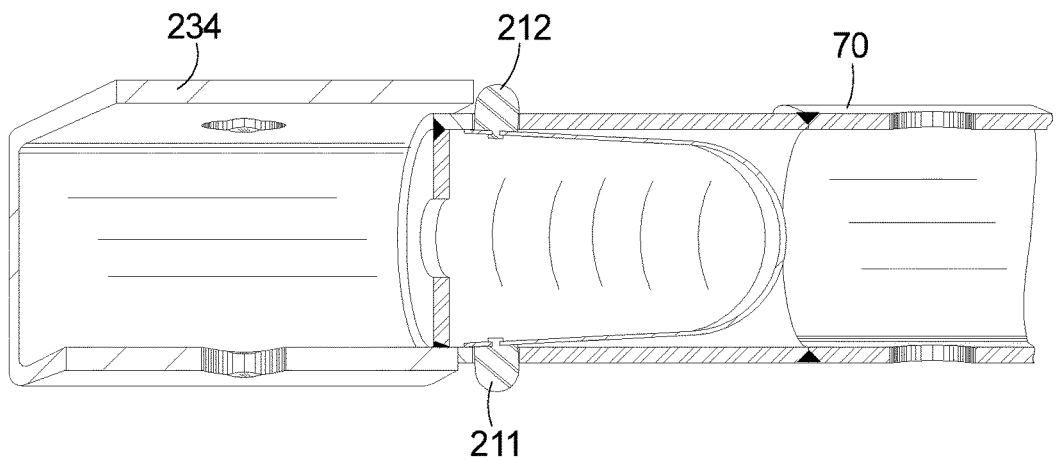
FIG. 28 is a cross-sectional view of a portion of the cargo carrier assembly and the mount-and-rotation tube assembly of FIG. 27 taken along lines 28-28 in FIG. 27.

At step 552, referring to FIGS. 27, 28 and 34, the user moves the receiver tube 234 further longitudinally away from the end tubular portion 104 to de-couple the receiver tube 234 from the mount-and-rotation tube assembly 70.

At step 554, the user removes the first clevis pin 52 from the trailer hitch receiver 50 and the first and second clevis pin holes 151, 152 in the main tubular portion 100.

At step 556, the user removes the first end portion 131 of the main tubular portion 100 of the mount-and-rotation tube assembly 70 from the trailer hitch receiver 50 on the vehicle 20.

Figure 29:
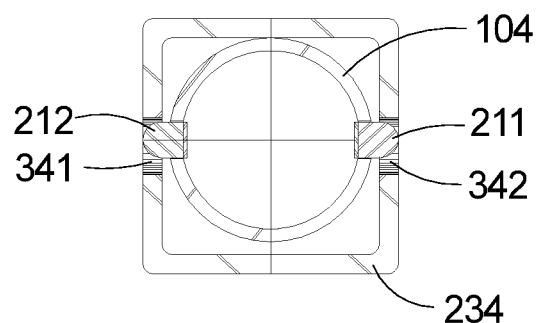
FIG. 29 is a schematic of an end tubular portion of the mount-and-rotation tube assembly and a receiver tube of the cargo carrier assembly with 0 degrees rotation of the receiver tube relative to the end tubular portion taken along lines 29-29 in FIG. 23.

Referring to FIG. 29, the position of the receiver tube 234 relative to the end tubular portion 104 is illustrated when the first and second pins 211, 212 are aligned with the receiver holes 341, 342.

Figure 30:
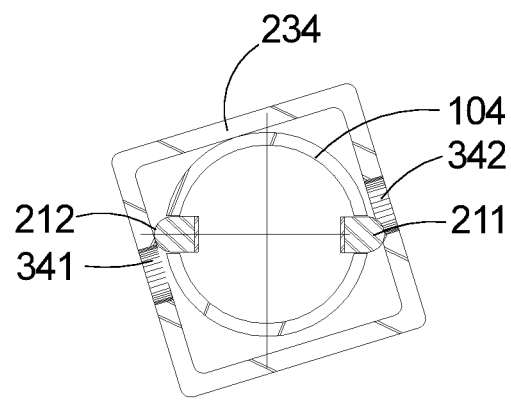
FIG. 30 is a schematic of an end tubular portion of the mount-and-rotation tube assembly and a receiver tube of the cargo carrier assembly with 15 degrees rotation of the receiver tube relative to the end tubular portion taken along lines 30-30 in FIG. 25.

Referring to FIG. 30, the position of the receiver tube 234 relative to the end tubular portion 104 is illustrated when the receiver tube 234 is rotated 17 degrees relative to the end tubular portion 104.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A cargo hauling assembly, comprising:
a mount-and-rotation tube assembly having a main tubular portion, an end tubular portion, a circular end cap, and a spring pin assembly having first and second pins; the main tubular portion having a first end portion and a second end portion, a first end of the end tubular portion being coupled to the second end portion of the main tubular portion, a second end of the end tubular portion being coupled to the circular end cap, the main tubular portion having a rectangular cross-sectional shape with first and second walls disposed parallel to one another, the first and second walls of the main tubular portion having first and second clevis pin holes, respectively, extending therethrough at the first end portion; the first and second walls of the main tubular portion having third and fourth clevis pin holes, respectively, extending therethrough at the second end portion; the end tubular portion having a circular cross-sectional shape with first and second pin apertures extending therethrough; the spring pin assembly being disposed in the end tubular portion such that the first and second pins extend through the first and second pin apertures, respectively and outwardly from the end tubular portion;
a cargo carrier assembly having a rectangular-shaped frame, a receiver tube, and first and second wheels, the first and second wheels being rotatably coupled to the rectangular-shaped frame; the receiver tube being coupled to and extending transversely across the rectangular-shaped frame and extending outwardly from the rectangular-shaped frame, the receiver tube having a rectangular cross-sectional shape with first and second walls disposed parallel to one another and defining an interior region, the first and second walls of the receiver tube having first and second receiver holes, respectively, extending therethrough; the receiver tube being sized and shaped to receive the end tubular portion in the interior region thereof;
the cargo carrier assembly being coupled to the mount-and-rotation tube assembly such that the first and second walls of the receiver tube are parallel to the first and second walls, respectively, of the main tubular portion of the mount-and-rotation tube assembly and the first and second pins are compressed by the first and second walls, respectively, of the receiver tube; and
a clevis pin being disposed through the first and second receiver holes and the third and fourth clevis pin holes to couple the receiver tube to the mount-and-rotation tube assembly.

2. The cargo hauling assembly of claim 1, wherein:
when coupling the receiver tube of the cargo carrier assembly to the mount-and-rotation tube assembly, a second end portion of the rectangular-shaped frame of the cargo carrier assembly being raised while the first and second wheels are contacting a ground surface, and the receiver tube being disposed on the end tubular portion such that the end tubular portion is received in the interior region of the receiver tube and the first and second pins are moved longitudinally past the first and second receiver holes; and the receiver tube being rotated on the end tubular portion such that the first and second walls of the receiver tube are parallel to the first and second walls, respectively, of the main tubular portion of the mount-and-rotation tube assembly and the first and second pins are compressed by the first and second walls, respectively, of the receiver tube; and the receiver tube being moved further longitudinally toward the main tubular portion of the mount-and-rotation tube assembly such that the first and second receiver holes, respectively, of the receiver tube are aligned with the third and fourth clevis pin holes of the main tubular portion.

3. The cargo hauling assembly of claim 1, further comprising:
a set-screw extending through a set-screw hole of the receiver tube and disposed against the main tubular portion of the mount-and-rotation tube assembly to further couple the receiver tube to the mount-and-rotation assembly to prevent the cargo carrier assembly from wobbling relative to the mount-and-rotation tube assembly.

4. The cargo hauling assembly of claim 3, wherein:
when de-coupling the receiver tube from the mount-and-rotation tube assembly, the clevis pin being removed from the first and second receiver holes and the third and fourth clevis pin holes, and the set-screw being moved away from the main tubular portion such that the set-screw no longer contacts the main tubular portion, and the receiver tube being moved longitudinally away from the first end portion of the main tubular portion such the first and second pins of the spring pin assembly extend at least partially through the first and second receiver holes, respectively, of the receiver tube to stop longitudinal movement of the rectangular-shaped frame of the cargo carrier assembly; and the receiver tube of the cargo carrier assembly being rotated on the end tubular portion of the mount-and-rotation tube assembly such that the first and second pins no longer extend partially through the first and second receiver holes, respectively, and the first and second wheels contact the ground surface, and the receiver tube being moved further longitudinally away from the end tubular portion to de-couple the receiver tube from the mount-and-rotation tube assembly.

5. The cargo hauling assembly of claim 1, wherein:
the first and second clevis pin holes of the main tubular portion being aligned transversely across the main tubular portion with one another; and
the third and fourth clevis pin holes of the main tubular portion being aligned transversely across the main tubular portion with one another.

6. The cargo hauling assembly of claim 1, wherein:
the first pin aperture of the end tubular portion being longitudinally aligned with the first and third clevis pin holes of the main tubular portion; and the second pin aperture of the end tubular portion being longitudinally aligned with the second and fourth clevis pin holes of the main tubular portion.

7. The cargo hauling assembly of claim 1, wherein:
the rectangular-shaped frame having first and second side tubular portions and first and second end tubular portions;
the first and second side tubular portions extending parallel to one another; and
the first and second end tubular portions being coupled to and between the first and second side tubular portions.

8. The cargo hauling assembly of claim 7, wherein:
the cargo carrier assembly further having a grab bar being coupled to and between the first and second side tubular portions.

9. The cargo hauling assembly of claim 7, wherein:
the cargo carrier assembly further having first and second axle portions being coupled to the first and second side tubular portions, respectively, and extending outwardly from the first and second side tubular portions, respectively;
the first wheel being rotatably coupled to the first axle portion; and
the second wheel being rotatably coupled to the second axle portion.

10. The cargo hauling assembly of claim 1, further comprising:
a cargo box being coupled to the rectangular-shaped frame of the cargo carrier assembly.

11. A method for utilizing a cargo carrier assembly on a vehicle, comprising:
providing a mount-and-rotation tube assembly having a main tubular portion, an end tubular portion, a circular end cap, and a spring pin assembly having first and second pins; the main tubular portion having a first end portion and a second end portion, a first end of the end tubular portion being coupled to the second end portion of the main tubular portion, a second end of the end tubular portion being coupled to the circular end cap, the main tubular portion having a rectangular cross-sectional shape with first and second walls disposed parallel to one another, the first and second walls of the main tubular portion having first and second clevis pin holes, respectively, extending therethrough at the first end portion; the first and second walls of the main tubular portion having third and fourth clevis pin holes, respectively, extending therethrough at the second end portion; the end tubular portion having a circular cross-sectional shape with first and second pin apertures extending therethrough; the spring pin assembly being disposed in the end tubular portion such that the first and second pins extend through the first and second pin apertures, respectively and outwardly from the end tubular portion;
providing the cargo carrier assembly having a rectangular-shaped frame, a receiver tube, and first and second wheels, the first and second wheels being rotatably coupled to the rectangular-shaped frame; the receiver tube being coupled to and extending transversely across the rectangular-shaped frame and extending outwardly from the rectangular-shaped frame, the receiver tube having a rectangular cross-sectional shape with first and second walls disposed parallel to one another and defining an interior region, the first and second walls of the receiver tube having first and second receiver holes, respectively, extending therethrough; the receiver tube being sized and shaped to receive the end tubular portion in the interior region thereof;

raising a second end portion of the rectangular-shaped frame of the cargo carrier assembly while the first and second wheels are contacting a ground surface, and the receiver tube being disposed on the end tubular portion such that the end tubular portion is received in the interior region of the receiver tube and the first and second pins are moved longitudinally past the first and second receiver holes;

rotating the receiver tube on the end tubular portion such that the first and second walls of the receiver tube are parallel to the first and second walls, respectively, of the main tubular portion of the mount-and-rotation tube assembly and the first and second pins are compressed by the first and second walls, respectively, of the receiver tube;

moving the receiver tube further longitudinally toward the main tubular portion of the mount-and-rotation tube assembly such that the first and second receiver holes, respectively, of the receiver tube are aligned with the third and fourth clevis pin holes of the main tubular portion; and inserting a clevis pin through the first and second receiver holes and the third and fourth clevis pin holes to couple the receiver tube to the mount-and-rotation tube assembly.

12. The method of claim 11, wherein:

the cargo carrier assembly further includes a set-screw;

the method further comprising:

disposing the set-screw through a set-screw hole of the receiver tube and against the main tubular portion of the mount-and-rotation tube assembly to further couple the receiver tube to the mount-and-rotation assembly to prevent the cargo carrier assembly from wobbling relative to the mount-and-rotation tube assembly.

13. The method of claim 11, further comprising:

removing the second clevis pin from the first and second receiver holes and the third and fourth clevis pin holes;

moving the set-screw away from the main tubular portion such that the set-screw no longer contacts the main tubular portion;

moving the receiver tube longitudinally away from the first end portion of the main tubular portion until the first and second pins of the spring pin assembly extend at least partially through the first and second receiver holes, respectively, of the receiver tube to stop longitudinal movement of the rectangular-shaped frame of the cargo carrier assembly;

rotating the receiver tube of the cargo carrier assembly on the end tubular portion of the mount-and-rotation tube assembly such that the first and second pins no longer extend partially through the first and second receiver holes, respectively, and the first and second wheels contact the ground surface; and moving receiver tube moved further longitudinally away from the end tubular portion to de-couple the receiver tube from the mount-and-rotation tube assembly.

14. The method of claim 11, further comprising:

inserting the first end portion of the main tubular portion of the mount-and-rotation tube assembly into a trailer hitch receiver on the vehicle; and inserting another clevis pin through both the trailer hitch receiver and the first and second clevis pin holes in the main tubular portion.

15. The method of claim 14, further comprising:

removing the another clevis pin from the trailer hitch receiver and the first and second clevis pin holes in the main tubular portion; and removing the first end portion of the main tubular portion of the mount-and-rotation tube assembly from the trailer hitch receiver on the vehicle.

\* \* \* \* \*